(12) United States Patent
Browne et al.

(10) Patent No.: US 7,770,959 B2
(45) Date of Patent: Aug. 10, 2010

(54) DOOR ACTUATION SYSTEMS USING ACTIVE MATERIALS

(75) Inventors: Alan L. Browne, Grosse Pointe, MI (US); Nancy L. Johnson, Northville, MI (US); Xiujie Gao, Troy, MI (US); Jack L. Bailey, Center Line, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 171 days.

(21) Appl. No.: 11/929,209

(22) Filed: Oct. 30, 2007

(65) Prior Publication Data

US 2008/0120911 A1 May 29, 2008

Related U.S. Application Data

(60) Provisional application No. 60/863,478, filed on Oct. 30, 2006, provisional application No. 60/887,690, filed on Feb. 1, 2007.

(51) Int. Cl.
*E05F 15/00* (2006.01)

(52) U.S. Cl. .................. 296/146.12; 292/38; 49/339
(58) Field of Classification Search .................. 49/339, 49/340, 394, 395; 292/38; 296/146.1, 146.12
See application file for complete search history.

(56) References Cited

U.S. PATENT DOCUMENTS

| | | | |
|---|---|---|---|
| 6,675,536 B1 * | 1/2004 | Williams et al. ............... 49/395 |
| 6,813,811 B2 * | 11/2004 | Matsuki et al. ............. 16/86 B |
| 2004/0031301 A1 * | 2/2004 | Dominique ................... 70/237 |
| 2005/0195064 A1 * | 9/2005 | Biasiotto et al. ............ 337/140 |
| 2007/0071575 A1 * | 3/2007 | Rudduck et al. ............ 411/386 |
| 2008/0022674 A1 * | 1/2008 | Brown et al. .................. 60/527 |

\* cited by examiner

*Primary Examiner*—Patricia L Engle
*Assistant Examiner*—Pinel E Romain
(74) *Attorney, Agent, or Firm*—Quinn Law Group, PLLC

(57) ABSTRACT

A door system includes a structural member and a door being selectively movable with respect to the structural member. An actuator includes an active material that is configured to change at least one attribute in response to an activation signal. The actuator is configured such that the change in at least one attribute causes the door to move relative to the structural member.

7 Claims, 19 Drawing Sheets

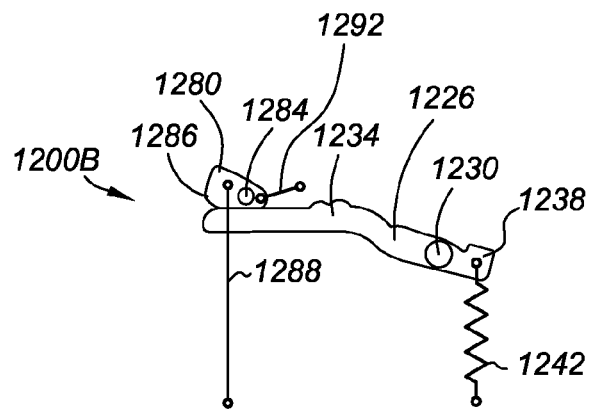
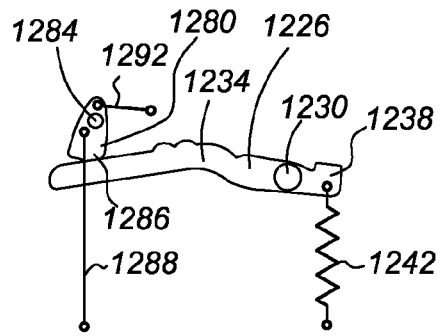
FIG. 20A
FIG. 20B
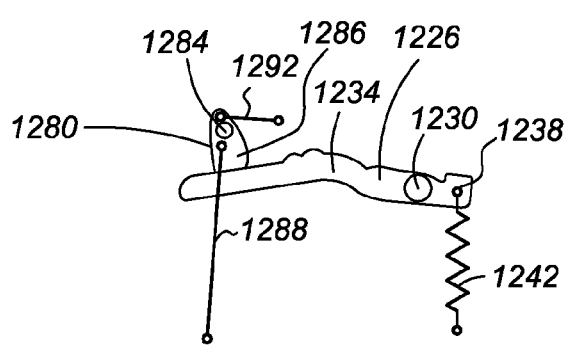
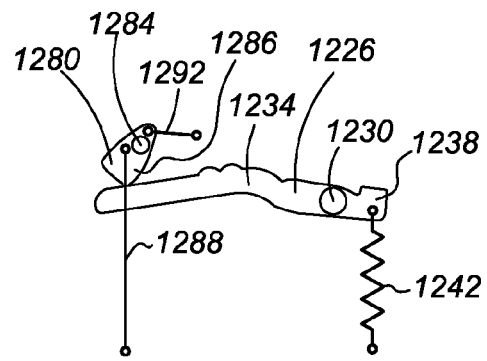
FIG. 20C
FIG. 20D

US 7,770,959 B2

DOOR ACTUATION SYSTEMS USING ACTIVE MATERIALS

CROSS REFERENCE TO RELATED APPLICATIONS

This application claims the benefit of U.S. Provisional Patent Application No. 60/863,478, filed Oct. 30, 2006, and U.S. Provisional Patent Application No. 60/887,690, filed Feb. 1, 2007, each of which is hereby incorporated by reference in its entirety.

TECHNICAL FIELD

This invention relates to door systems having active materials to selectively urge a door toward its open or closed position.

BACKGROUND OF THE INVENTION

A typical automotive vehicle includes a vehicle body defining a passenger compartment. Doors are selectively movable between open and closed positions to permit access (ingress and egress) to the passenger compartment and obstruct access to the passenger compartment, respectively, as understood by those skilled in the art. A latch is typically employed to maintain a door in its closed position. To open a door, a vehicle user must pull on a door handle to release the latch and manually move the door to the open position.

SUMMARY OF THE INVENTION

A door system includes a structural member, a door that is movably mounted with respect to the structural member, and an actuator. The actuator includes an active material that is configured to undergo a change in an attribute in response to an activation signal. The active material is operatively connected to the door such that the change in the attribute causes the door to move relative to the structural member.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIGS. 20A-20D are schematic side views of an alternative active materials based reset mechanism for use with the latch system of FIG. 19;

DESCRIPTION OF THE PREFERRED EMBODIMENTS

Figure 1:
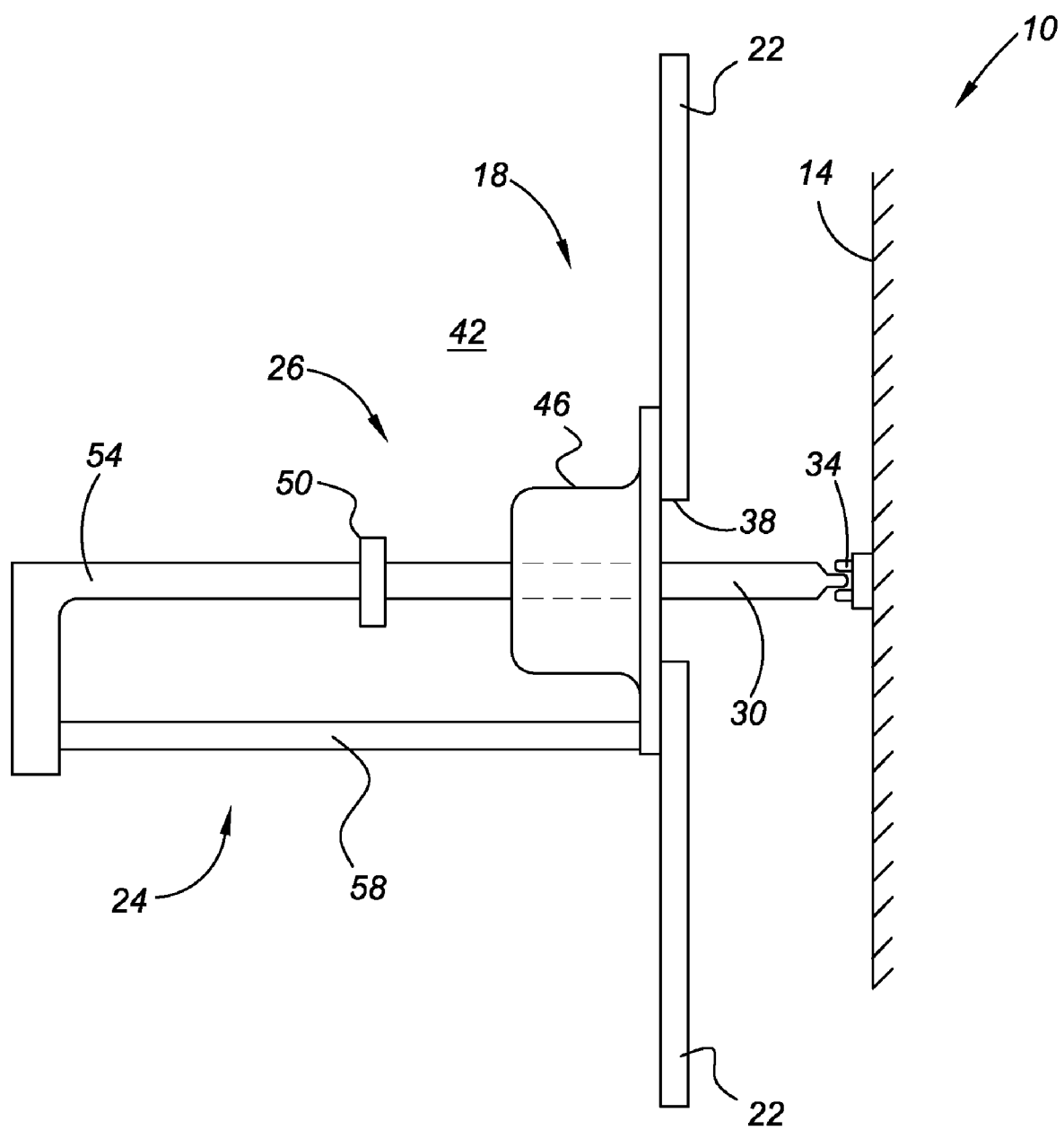
FIG. 1 is a schematic, sectional, side view of a door having an active material based actuator configured to transmit force from the active material to the door.

Referring to FIG. 1, a vehicle body 10 includes a hinge pillar 14, as understood by those skilled in the art. A vehicle door 18 is selectively movable between an open position and a closed position. More specifically, at least one hinge (not shown) interconnects the hinge pillar 14 and the door 18 such that the door 18 is selectively rotatable with respect to the hinge pillar 14 between the open and closed positions. The door 18 includes an inner panel, a portion of which is shown at 22. A door actuator 24 includes a check link assembly 26, also sometimes referred to as a "door check" or a "hold open." The check link assembly 26 includes a check link 30. The check link 30 is pivotably mounted with respect to the hinge pillar 14 via a bracket 34 mounted to the hinge pillar 14. More specifically, the check link 30 is rotatable at the bracket 34 about an axis that is substantially parallel to the axis of rotation of the door 18 about the hinge. As used herein, a "hinge pillar" may include a front hinge pillar, a B-pillar, etc.

The check link 30 extends through an aperture 38 formed in the inner panel 22 and into the door cavity 42, which is defined by the inner panel 22 and an outer panel (not shown), as understood by those skilled in the art. The check link 26 also includes a housing 46 that is disposed within the door cavity 42 and mounted to the inner panel 22. The housing 46 contains springs (not shown). The check link 30 extends through the housing 46, and is selectively moveable therethrough. The check link 30 defines ramps, depressions, etc. (not shown in FIG. 1), that interact with the springs to vary the resistance to movement of the door 18 during its rotation between the open and closed positions, as understood by those skilled in the art.

A stop 50 is mounted at one end of the check link 30 to restrict excessive movement of the check link 30 with respect to the housing 46. More specifically, the stop 50 is larger than the aperture in the housing 46 through which the check link 30 extends, and therefore prevents movement of the end of the check link 30 through the housing 46 by physically interacting with the housing 46. The check link 26 also includes an L-shaped member 54 that is mounted to the check link 30 adjacent the stop 50. The door actuator 24 also includes an active material member, which, in the embodiment depicted, is a shape memory alloy (SMA) wire 58. The SMA wire 58 is operatively connected to the check link 30 via the member 54. The SMA wire is also operatively connected to the housing 46.

A shape memory alloy is characterized by a cold state, i.e., when the temperature of the alloy is below its martensite finish temperature $M_f$. A shape memory alloy is also characterized by a hot state, i.e., when the temperature of the alloy is above its austenite finish temperature $A_f$. An object formed of the alloy may be characterized by a predetermined shape. When the object is pseudo-plastically deformed in the cold state, the strain may be reversed by heating the object above its austenite finish temperature $A_f$, i.e., heating the object above its $A_f$ will cause the object to return to its predetermined shape. An SMA's modulus of elasticity and yield strength are also significantly lower in the cold state than in the hot state. As understood by those skilled in the art, pseudo-plastic strain is similar to plastic strain in that the strain persists despite removal of the stress that caused the strain. However, unlike plastic strain, pseudo-plastic strain is reversible when the object is heated to its hot state.

The SMA wire 58 is characterized by a predetermined length. When the door 18 is moved to its closed position and the SMA wire 58 is in its cold state, the housing 46 moves closer to the hinge pillar 14, causing tension on the SMA wire 58. The tension causes the SMA wire to pseudo-plastically deform and assume a length greater than its predetermined length, i.e., an elongated state. By causing the SMA wire 58 to enter its hot state, the SMA wire 58 returns to its predetermined state, thereby exerting forces on the housing 46 and the check link 30. Thus, the wire 58 changes attributes, namely shape and modulus, in response to a thermal activation signal.

More specifically, when the SMA wire 58 returns to its predetermined length from its elongated state, the wire 58 urges the check link 30 against the hinge pillar 14 and urges the housing 46 toward the stop 50, thereby moving the door 18 from its closed position toward its open position.

Figure 2:
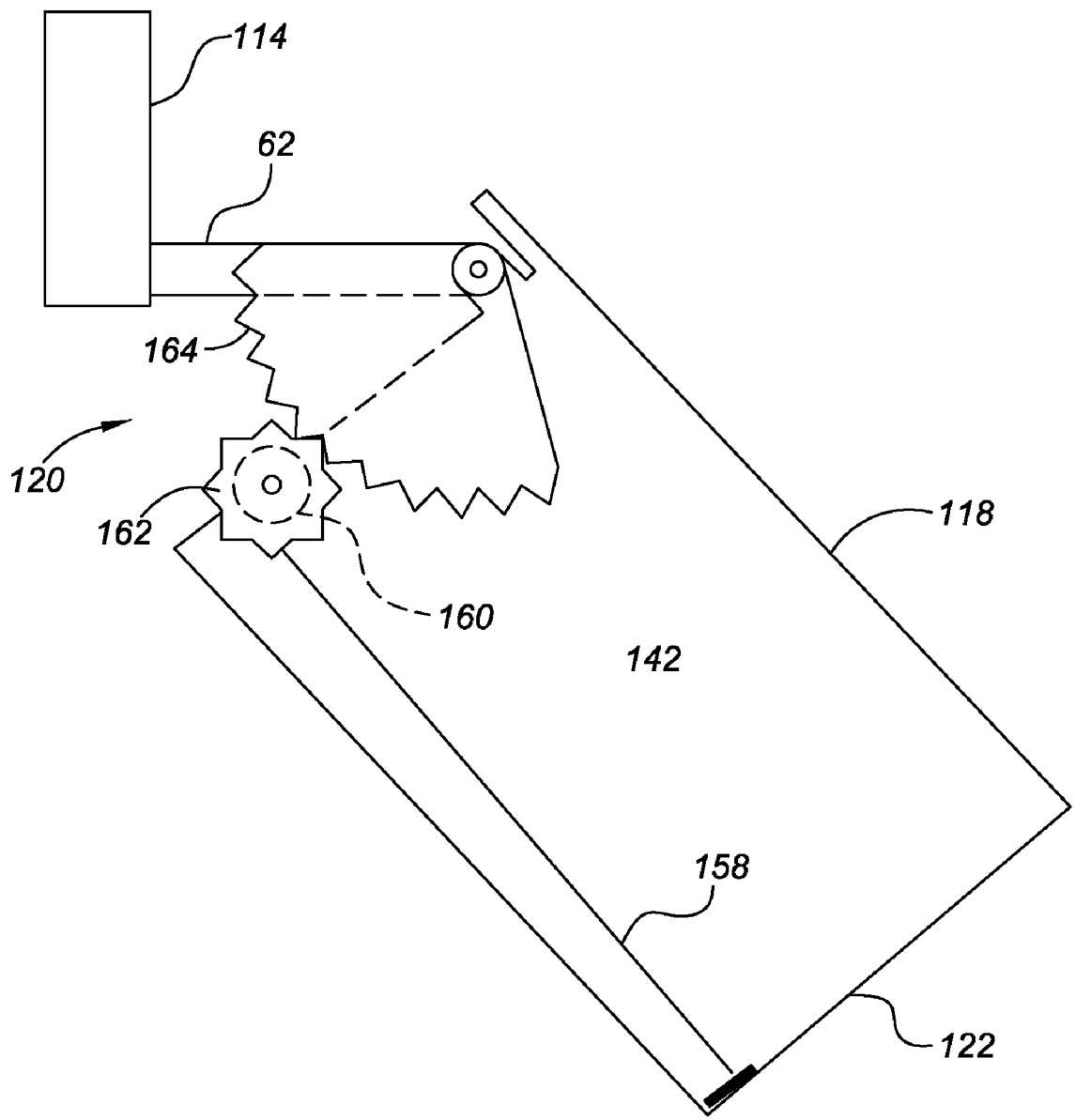
FIG. 2 is a schematic, sectional top view of another door system having another active material based actuator configured to transmit force from the active material to the door.

Referring to FIG. 2, wherein like reference numbers refer to like components from FIG. 1, vehicle door assembly 118 is rotatably mounted with respect to hinge pillar 114 via a hinge 62. Door opening actuator 120 includes a shape memory alloy wire 158, a pulley 160, a pinion gear 162, and a sector gear 164. The sector gear 164 is rigidly mounted with respect to the hinge pillar 114. The pulley 160 is rigidly mounted to the pinion gear 162, and the pulley and pinion gear are rotatably mounted with respect to the door assembly 118 for rotation together about a common axis. The pinion gear 162 is meshingly engaged with the sector gear 164. The SMA wire 158 is rigidly mounted with respect to the inner panel 122 of the door assembly 118 at one end, a segment of the SMA wire 158 traverses the door cavity 142, and another segment of the SMA wire 158 is wound around the pulley 160.

The SMA wire 158 is characterized by a predetermined length, and the door opening actuator 120 is configured such that the wire 158 is the predetermined length when the door assembly 118 is at least partially open, as shown in FIG. 2. As the door assembly 118 is moved toward its closed position, movement of the pinion gear 162 relative to the sector gear 164 causes rotation of the pinion gear 162 in a first direction and, correspondingly, rotation of the pulley 160 in the first direction. Rotation of the pulley 160 as the door assembly is closing causes a tensile load on the SMA wire 158, and the SMA wire 158 is pseudo-plastically deformed to a length longer than the predetermined length. Thus, when the door assembly 118 is in its closed position, the SMA wire 158 is longer than the predetermined length.

Heating the SMA wire 158 to its hot state when the door assembly 118 is in its closed position causes the SMA wire 158 to revert to its predetermined length and increase its modulus, which in turn causes the SMA wire 158 to exert a force on the pulley 160 that causes the pulley 160, and correspondingly the pinion gear 162, to rotate in a second direction opposite to the first direction. The pinion gear 162, when rotating in the second direction, exerts force on the teeth of the sector gear 164, which exerts a corresponding reaction force on the teeth of the pinion gear 162. The reaction force on the teeth of the pinion gear 162 results in a moment about the axis of rotation of the door assembly 118 at the hinge 62, which urges the door assembly 118 toward its open position.

Active material-based actuators may also be used to close doors. For example, if the SMA wire 158 is wound around the pulley 160 in the opposite direction from that shown in FIG. 2, then movement of the door assembly 118 toward its open position will cause a tensile load on the SMA wire 158, and the SMA wire 158 will be pseudo-plastically strained to a length longer than its predetermined length. Thus, in such an embodiment, the SMA wire 158 would be longer than its predetermined length when the door assembly 118 is in its open position. Accordingly, heating the SMA wire 158 to its hot state would result in the door assembly 118 closing.

It should be noted that other actuators may be employed. For example, an electric motor may be operatively connected to the pinion gear 162 to selectively rotate the pinion gear 162; rotation of the pinion gear 162 in one direction by the electric motor would cause the door assembly 118 to move to its open position, and rotation of the pinion gear 162 in the other direction by the electric motor would cause the door assembly 118 to move to its closed position.

Figure 3:
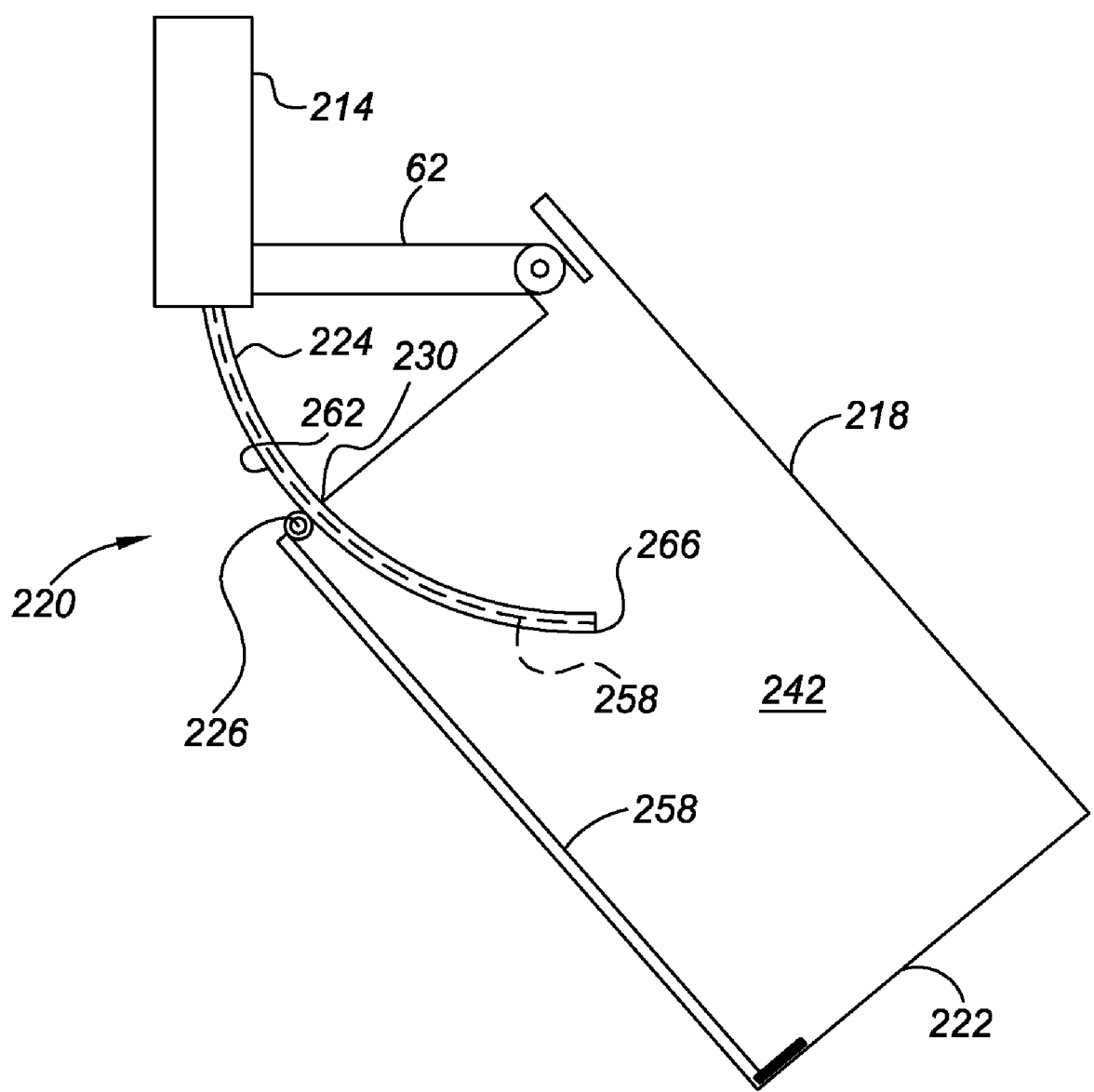
FIG. 3 is a schematic, sectional top view of yet another door having yet another active material based actuator configured to transmit force from the active material to the door.

Referring to FIG. 3, vehicle door assembly 218 is rotatably mounted with respect to hinge pillar 214 via hinge 62. A door opening actuator 220 includes a quarter pulley 224, a pulley 226, and an SMA wire 258.

The quarter pulley 224 is rigidly mounted with respect to the hinge pillar 214. The quarter pulley 224 extends from the hinge pillar 214, through an aperture 230 formed in the inner panel 222 of the door assembly 218, and into the door cavity 242. The quarter pulley 224 is curved and, in the embodiment depicted, forms one quarter of a circle. The quarter pulley 224 defines a groove 262 that is open in the inboard direction, i.e., toward the vehicle body.

The pulley 226 is rotatably mounted with respect to the door assembly 218 for rotation about a vertical axis. The SMA wire 258 is mounted with respect to the inner panel 222 of the door assembly 218, extends across the door cavity 242, engages the pulley 226, engages the quarter pulley 224 inside the groove 262 along a portion of the quarter pulley's length, and is mounted to the end 266 of the quarter pulley 224 inside the door cavity 242.

The SMA wire 258 is characterized by a predetermined length, and the door opening actuator 220 is configured such that the wire 258 is the predetermined length when the door assembly 218 is at least partially open, as shown in FIG. 3. As the door assembly 218 is moved toward its closed position, movement of the door assembly 218 relative to the quarter pulley 224 causes a tensile load on the SMA wire 258, and the SMA wire 258 is pseudo-plastically deformed to a length longer than the predetermined length. More specifically, as the door assembly 218 moves toward its closed position, movement of the door assembly 218 relative to the quarter pulley 224 causes the quarter pulley 224 to extend further into the door cavity, which pseudo-plastically deforms the SMA wire 258. Thus, when the door assembly 218 is in its closed position, the SMA wire 258 is longer than its predetermined length.

Heating the SMA wire 258 to its hot state when the door assembly 218 is in its closed position causes the SMA wire 258 to revert to its predetermined length and increase in modulus, which in turn causes the SMA wire 258 to exert force on the quarter pulley 224 and the inner panel 222 which urges the door assembly 218 toward its open position.

Heating an SMA wire is preferably accomplished with electrical resistance heating, i.e., supplying current through the SMA wire to heat it to its hot state, in response to a signal to open the door, e.g., a wireless transmission from a key fob. In an exemplary embodiment, a wireless receiver (not shown) is configured to transmit a signal to a controller (not shown) when the wireless receiver receives a transmission from the key fob. In response to the signal, the controller is configured to cause electrical resistance heating of the SMA wire for a predetermined amount of time or until a predetermined change in length (displacement) occurs, and to cause an electrically actuated latch (not shown) that is connected to the door to release a striker (not shown) that is connected to the vehicle body. Sensors (not shown), such as proximity sensors, may be configured to monitor the proximity of objects to the door and to communicate the proximity of objects to the door to the controller so that the controller can vary the amount of opening of the door to avoid contact between the door and the object. Sensors may also be configured to monitor the door opening angle and the status of the door opening actuator and to communicate the door opening angle and the status of the door opening actuator to the controller. For example, the controller may also be programmed to reheat the wire in the event that the door closes by itself, e.g., if the vehicle body is at an incline. It may be desirable to add or alter detent positions of a door check to accommodate the door opening actuators, or to include a friction continuous detent. Preset/programmable stops (door opening angles) may be employed. Sensors may also be employed to monitor the speed and proximity of objects that may impact the door.

In the class of embodiments represented by FIGS. 1-3, the SMA wire preferably cools to its cold state soon after the door is opened so that the SMA wire exhibits lower resistance to strain (i.e., the lower modulus of its cold state) during closure of the door assembly in order to minimize door closing efforts.

Figure 4:
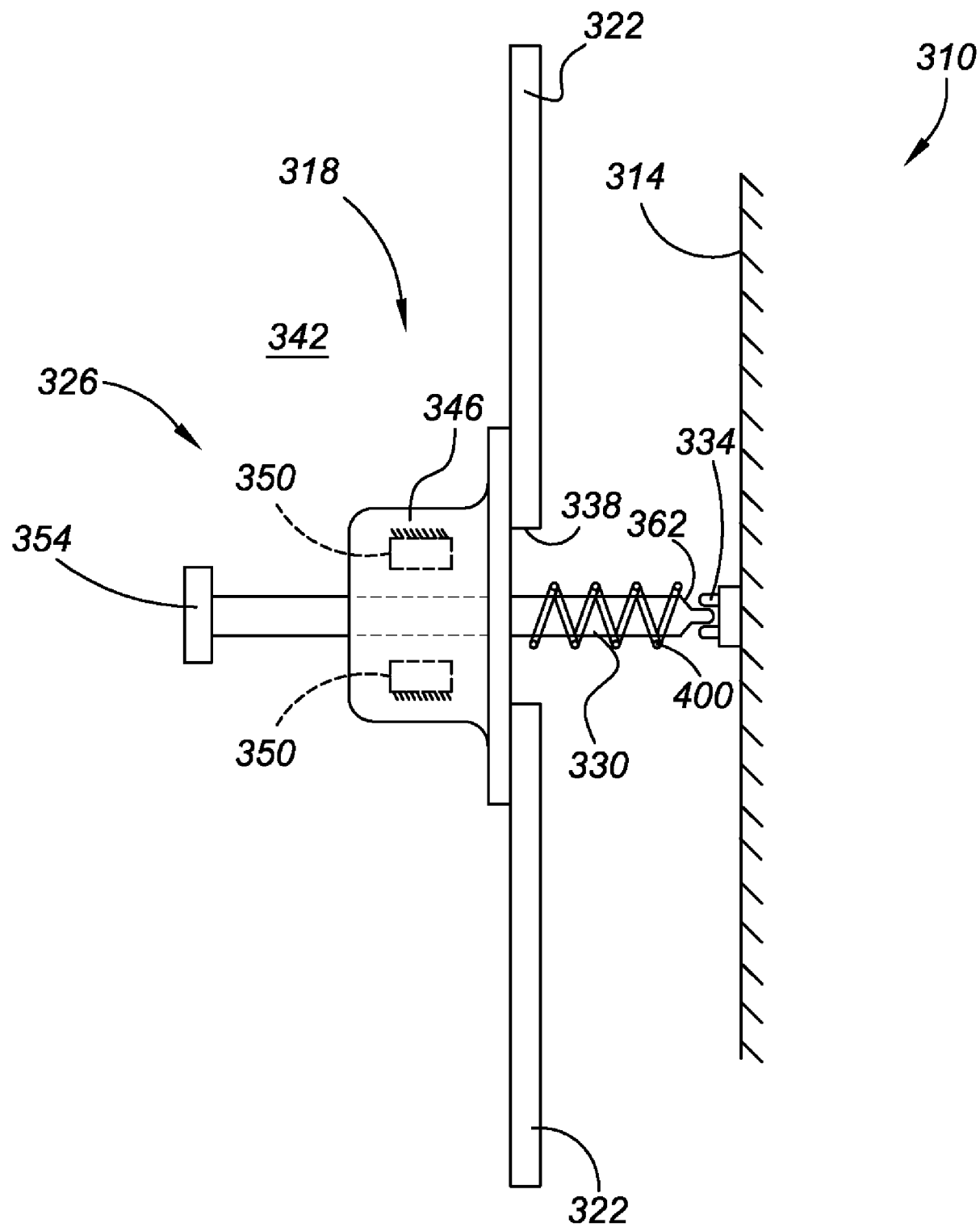
FIG. 4 is a schematic, sectional, side view of a door having a check link and a spring circumscribing the check link and biasing the door toward its open position.

Referring to FIG. 4, a vehicle body 310 includes a hinge pillar 314, as understood by those skilled in the art. A vehicle door 318 is selectively movable between an open position and a closed position. More specifically, at least one hinge (not shown) interconnects the hinge pillar 314 and the door 318 such that the door is selectively rotatable with respect to the hinge pillar 314 between the open and closed positions. The door 318 includes an inner panel, a portion of which is shown at 322. A check link 326, also sometimes referred to as a "door check" or a "hold open," includes a rod 330. The rod 330 is pivotably mounted with respect to the hinge pillar 314 via a bracket 334 mounted to the hinge pillar 314. More specifically, the rod 330 is rotatable at the bracket 334 about an axis that is substantially parallel to the axis of rotation of the door 318 about the hinge. As used herein, a "hinge pillar" may include a front hinge pillar, a B-pillar, etc.

The rod 330 extends through an aperture 338 formed in the inner panel 322 and into the door cavity 342, which is defined by the inner panel 322 and an outer panel (not shown), as understood by those skilled in the art. The check link 326 also includes a housing 346 that is disposed within the door cavity 342 and mounted to the inner panel 322. The housing 346 contains two springs 350. The rod 330 extends through the housing 346, and is selectively moveable therethrough between the springs 350. The rod 330 defines ramps, depressions, etc., (not shown in FIG. 4) that interact with the springs 350 to vary the resistance to movement of the door 318 during its rotation between the open and closed positions, as understood by those skilled in the art.

A stop 354 is mounted at one end of the rod 330 to restrict excessive movement of the rod 330 with respect to the housing 346. More specifically, the stop 354 is larger than the aperture in the housing 346 through which the rod 330 extends, and therefore prevents movement of the end of the rod 330 through the housing 346 by physically interacting with the housing 346.

Figure 5:
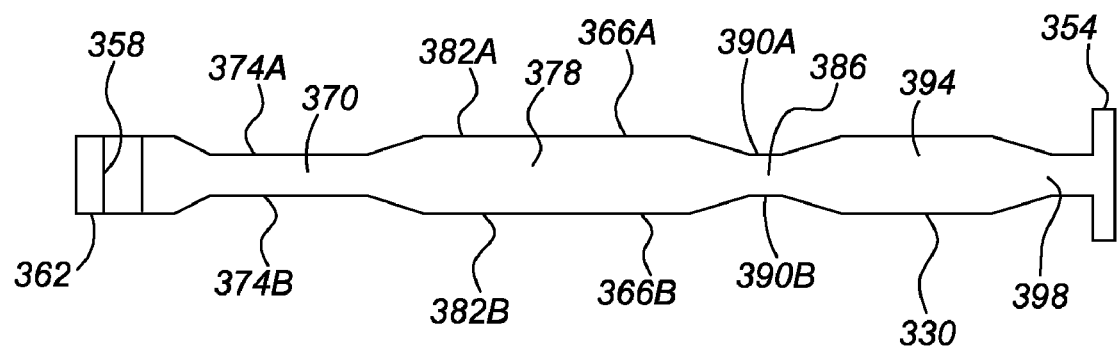
FIG. 5 is a schematic side view of the check link of FIG. 4.

Referring to FIGS. 4 and 5, the rod 330 defines a hole 358 at one end 362 through which a pin (not shown) is insertable to pivotably attach end 362 to the bracket shown at 334 in FIG. 4. Surfaces 366A, 366B on opposite sides of the rod 330 define a profile that affects the effort required to rotate the door 318 between its open and closed positions. When the door 318 is in the closed position, segment 370 of the rod 330 is within the housing 346 between the springs 350. Segments 374A, 374B of surfaces 366A, 366B act on a respective one of the springs 350.

As the door 318 is moved toward the open position, the rod 330 moves relative to the housing 346 so that segment 378 of the rod 330 is within the housing 346 between the springs 350 and segments 382A, 382B of surfaces 366A, 366B act on a respective one of the springs 350. Segment 378 is thicker than segment 370, i.e., surface segments 382A, 382B are spaced farther apart than surface segments 374A, 374B. Accordingly, the rod 330 causes the springs 350 to compress as the door 318 is moved from its closed position.

As the door 318 is moved further toward the open position, the rod 330 moves relative to the housing so that segment 386 is within the housing 346 and between the springs 350. Segments 390A, 390B of surfaces 366A, 366B act on a respective one of the springs 350. Segment 386 is thinner than segment 378, which is on one side of segment 386, and segment 394, which is on the other side of segment 386, and thus segment 386 acts a detent; that is moving the door 318 in either direction when the housing 346 engages segment 386 requires compressing the springs 350 and increased effort. Segment 398, on the opposite side of segment 394 from segment 386, is thinner than segment 394, and is the segment that is within the housing 346 and between the springs 350 when the door is in the fully open position.

A spring 400 is concentrically arranged around rod 330 between the door assembly 318 and the hinge pillar 314, and, when the door assembly 318 is in its closed position, the spring 400 is compressed by the door assembly 318 and the hinge pillar 314. Thus, the spring 400 urges the door assembly 318 toward its open position. When a door latch (not shown) is released, the spring will force the door 318 toward its open position.

Figure 6:
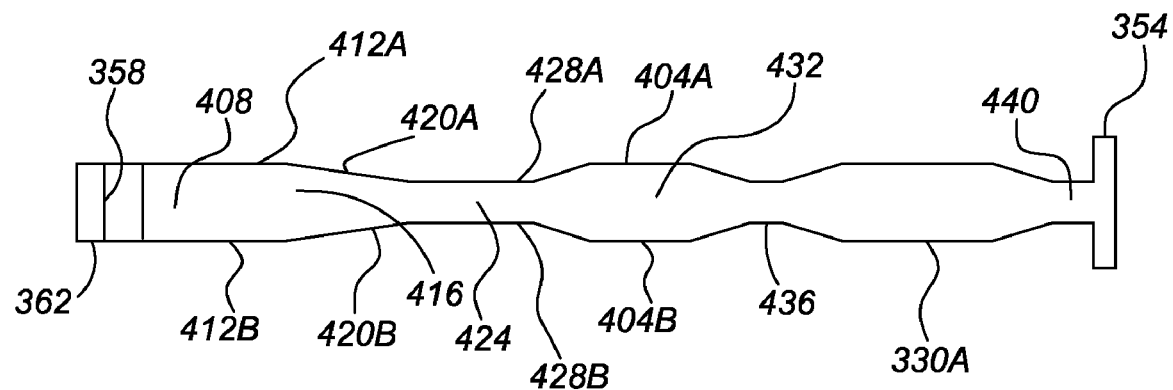
FIG. 6 is a schematic side view of an alternative check link for use with the door of FIG. 4.

FIG. 6, wherein like reference numbers refer to like components from FIGS. 4 and 5, schematically depicts an alternative rod 330A that may be used in place of rod 330. Referring to FIGS. 4 and 6, the rod 330A includes a stop 354 at one end, and defines a hole 358 at opposite end 362. A pin is insertable through hole 358 to pivotably connect end 362 of the arm 330A to the bracket shown at 334. Surfaces 404A, 404B on opposite sides of the rod 330A define a profile that affects the effort required to rotate the door assembly 318 between its open and closed positions. When the door assembly 318 is in the closed position, segment 408 of the rod 330A is within the housing 346 between the springs 350, and segments 412A, 412B of surfaces 404A, 404B act on a respective one of the springs 350. Segment 408 of the rod 330A is sufficiently thick that segments 412A, 412B act on the springs 350 such that the springs 350 are compressed.

As the door assembly 318 moves from its closed position toward the open position, the rod 330A moves with respect to the housing 346 such that segment 416 of the rod 330A is in the housing 346, with segments 420A, 420B of surfaces 404A, 404B acting on the springs 350. Segment 416 is a ramp segment, i.e., the segment 416 becomes progressively thinner in the direction away from segment 408. Segments 420A, 420B are not parallel; rather, the distance therebetween decreases with distance from rod segment 408. Accordingly, as the door assembly 318 is moved from the closed position toward the open position, the springs 350 become less compressed as the housing 346 traverses segment 416. The springs 350 thus assist in the movement of the door assembly 318 from the closed position toward the open position by acting on the surfaces 420A, 420B of the ramp segment 416. Segment 424 of the rod 330A, on the opposite side of the ramp segment 416 from segment 408, is characterized by parallel segments 428A, 428B of surfaces 404A, 404B.

Segment 432, on the opposite side of segment 424 from segment 416, is thicker than segment 424. Accordingly, as the door assembly 318 is moved closer toward the open position such that the housing 346 moves from segment 424 to segment 432, the springs 350 provide resistance as they are compressed by surfaces 404A, 404B. Segment 436 provides an intermediate detent position, and segment 440 is within the housing between the springs 350 when the door is in the fully open position.

Figure 7:
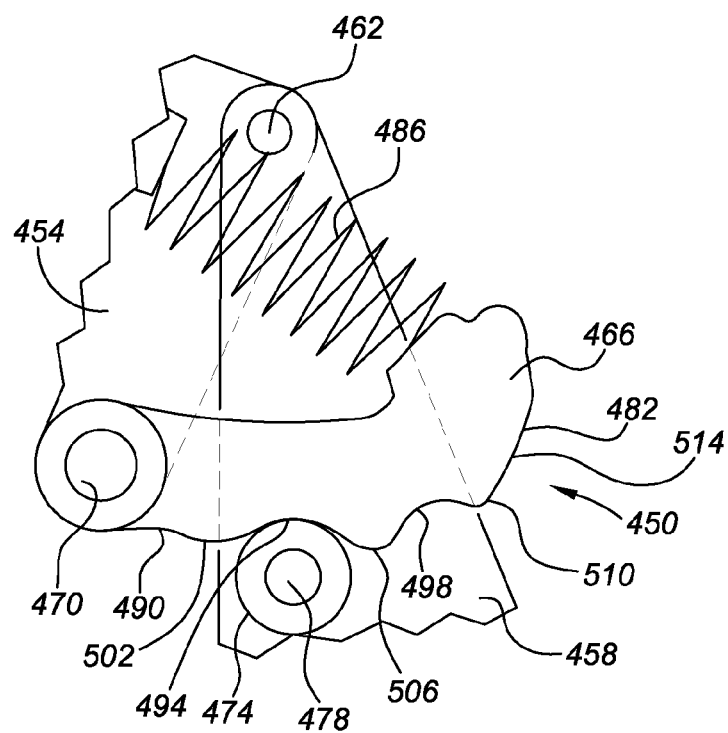
FIG. 7 is a schematic top view of a check link assembly with a door in a first position.
Figure 8:
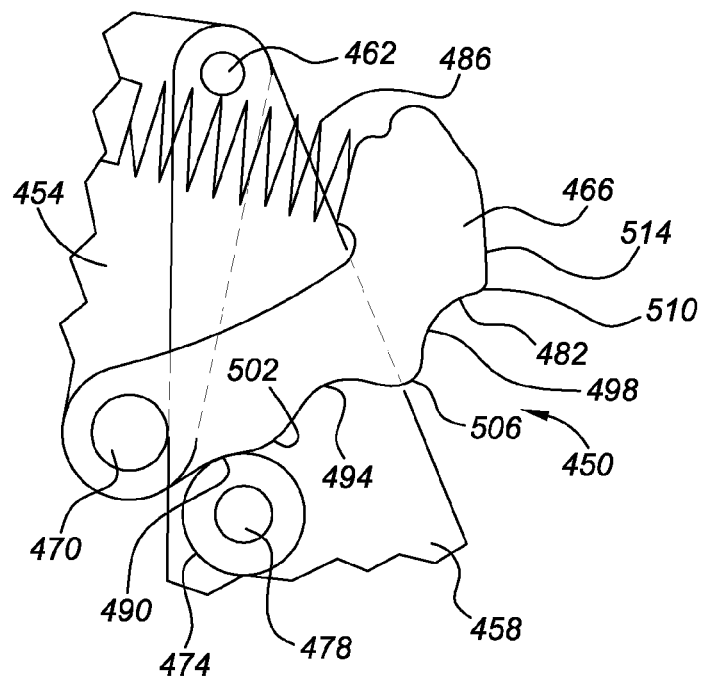
FIG. 8 is a schematic top view of the check link assembly of FIG. 7 with the door in a second position.

Referring to FIGS. 7 and 8, a check link assembly 450 is schematically depicted. The check link assembly 450 includes a first bracket 454 that is mounted to a vehicle door assembly, such as the door assembly shown at 318 in FIG. 4. The check link assembly 450 also includes a second bracket 458 that is mounted to a vehicle body hinge pillar, such as the hinge pillar shown at 314 in FIG. 4. The first bracket 454 is pivotably connected to the second bracket 458 at a hinge 462; that is, the first bracket 454 is selectively pivotable with respect to the second bracket 458 about hinge 462.

The check link assembly 450 also includes a check link 466 that is pivotably connected to the first bracket 454 at a hinge 470; that is, the check link 466 is selectively pivotable with respect to the first bracket 454 about hinge 470. A roller 474 is rotatably mounted with respect to the second bracket 458 by a pin 478.

The check link 466 includes a surface 482 that defines an edge of the check link 466. A spring 486 interconnects the check link 466 and the first bracket 454, and biases the check link 466 such that the surface 482 is in continuous contact with the roller 474. As the door assembly moves between its closed position and its fully opened position, the check link 466 moves with respect to the roller 474 such that the roller 474 traverses the surface 482. The surface 482 is characterized by peaks and depressions that the roller 474 encounters as the door assembly moves between the open and closed positions. More specifically, the surface defines a first depression 490, a second depression 494, and a third depression 498. A first peak 502 separates the first depression 490 and the second depression 494. A second peak 506 separates the second depression 494 and the third depression 498. A third peak 510 separates the third depression 498 from segment 514 of the surface 482, which is flat in the embodiment depicted.

When the door assembly is in the closed position, as shown in FIG. 8, the roller 474 contacts the surface 482 at the first depression 490. As the door assembly is rotated, it causes the first bracket 454 to rotate about hinge 462, which causes the check link 466 to move relative to the roller 474 such that the roller 474 traverses the peaks 502, 506, 510 and the depressions 490, 494, 498. As the roller 474 traverses one of the peaks 502, 506, 510, the check link 466 is forced against the spring 486, thereby compressing the spring 486 and providing resistance to the rotation of the door assembly, as understood by those skilled in the art.

Peak 502 is relatively small compared to peaks 506, 510, and, more specifically, the protuberance of peak 502 from depression 490 is smaller than the protuberance of the other peaks relative to their adjacent depressions. Thus, relatively little resistance is provided by the spring 486 in moving the door assembly from a fully closed position, in which the roller 474 contacts depression 490, to a partially open position, in which the roller 474 contacts depression 494. In a preferred embodiment, the resistance to rotation of the door caused by peak 502 is less than the forces acting on the door caused by compressed weatherstripping and door seals (not shown), and by the door latch (not shown), and thus, upon unlatching, the door assembly is able to move to a first open position such that the roller 474 contacts depression 494, as shown in FIG. 7, without a user-applied force. Depression 498 functions as an intermediate door position detent, and the roller 474 contacts segment 514 of the surface 482 when the door assembly is in the fully opened position. The check link 466 may be characterized by other peaks and depressions within the scope of the claimed invention. In the embodiment depicted, peak 502 is more protuberant from depression 494 than from depression 490, and thus movement of the door assembly from its partially opened position to its closed position requires more effort than moving the door assembly from its closed position to its partially opened position.

If the check link assembly 450 is used in connection with a door opening apparatus, such as those shown in FIGS. 6-8, then a spring compressed by an SMA wire may move the door from its closed position such that the roller is in contact with depression 494; peak 502 prevents the door from moving back to its closed position.

Figure 9:
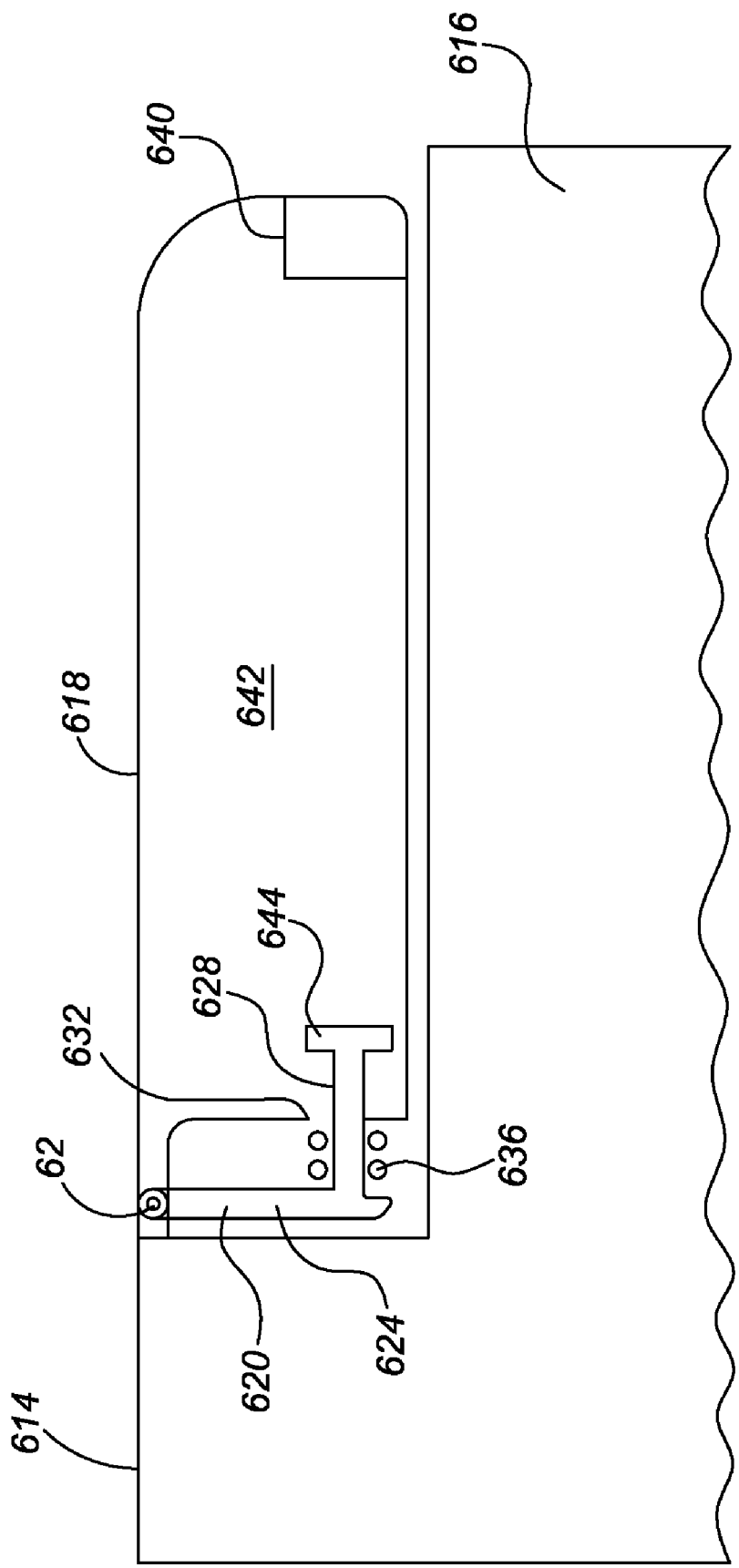
FIG. 9 is a schematic, sectional top view of a door having a spring configuration biasing the door toward its open position.

Referring to FIG. 9, a door assembly 618 is rotatably connected to a hinge pillar 614 of vehicle body 616 via hinge 62. An L-shaped member 620 is also rotatable about hinge 62, and is at least partially disposed between the hinge pillar 614 and the door assembly 618. When the door assembly 618 is in its closed position, as shown in FIG. 9, one arm 624 of the member 620 contacts the hinge pillar 614. The other arm 628 of the L-shaped member 620 extends through an aperture 632 formed in the door assembly 618 and into the door cavity 642. A spring 636 is concentrically arranged around arm 628 between the door assembly 618 and arm 624 and, when the door assembly 618 is in its closed position, the spring 636 is compressed by the door assembly 618 and the arm 624 of the L-shaped member 620. Thus, the spring 636 urges the door assembly 618 toward its open position. When the door latch 640 is released, the spring will force the door 618 toward its open position. The arm 628 is movable with respect to the door assembly 618 through the aperture 632 to accommodate the movement of the door 618 during opening. When a user closes the door, the spring is compressed again. The end 644 of arm 628 is enlarged to prevent it from travelling through the aperture 632.

Figure 10:
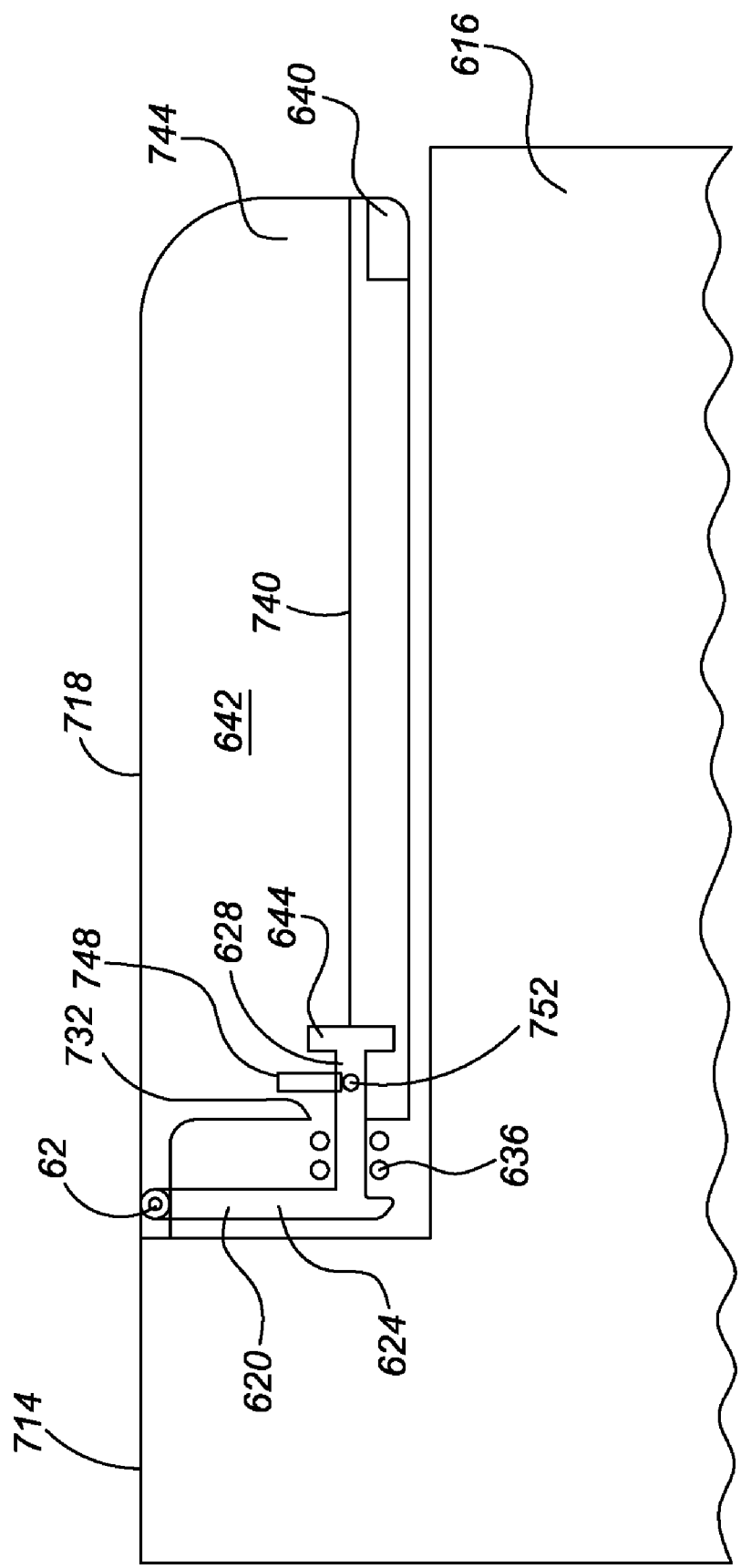
FIG. 10 is a schematic, sectional top view of a door having another spring configuration biasing the door toward its open position and an active material based actuator configured to selectively compress the spring.

Referring to FIG. 10, wherein like reference numbers refer to like components from FIG. 9, door assembly 718 is rotatably mounted with respect to hinge pillar 714 of vehicle body 616 via hinge 62. L-shaped member 620 is also rotatable about hinge 62, and is at least partially disposed between the hinge pillar 714 and the door assembly 718. When the door assembly 718 is in its closed position, as shown in FIG. 10, one arm 624 of the member 620 contacts the hinge pillar 714. The other arm 628 of the L-shaped member 620 extends through an aperture 732 formed in the door assembly 718 and into the door cavity 642. A spring 636 is concentrically arranged around arm 628 and, when the door assembly 718 is in its closed position, the spring 636 is compressed by the door assembly 718 and the arm 624 of the L-shaped member 620. Thus, the spring 636 urges the door assembly 718 toward its open position. When the door latch 640 is released, the spring 636 will force the door assembly 718 toward its open position. The arm 628 is movable with respect to the door assembly 718 through the aperture 732 to accommodate the movement of the door 718 during opening.

An SMA wire 740 is mounted to the arm 628 at one end and is mounted to the inner panel 744 of the door assembly 718 at the other end. The wire 740 is characterized by a predetermined length to which the wire 740 reverts in its hot state after being pseudo-plastically deformed. The predetermined length is such that the wire 740 draws the arm 628 into the door cavity 742, thereby compressing the spring 636 between arm 624 and the door assembly 718. When the wire 740 is in its cold state, its modulus of elasticity or yield strength is sufficiently low such that the spring 636, acting against the door assembly 718 and the arm 624, causes tensile strain in the wire 740, thereby increasing the length of the wire 740 from its predetermined length.

During operation of the door assembly 718, the wire 740 is heated to its hot state to compress the spring 636, thereby storing energy. A latch 748 is engageable with a full or partial hole 752 in the arm 628 to maintain the spring 636 in its compressed state after the wire 740 has cooled to its cold state. Accordingly, the wire 740 supplies the energy to compress the spring 636, and, therefore, the spring 636 does not affect the effort required to close the door assembly 718. When the door assembly 718 is to be opened, the latch 748 is released from the full or partial hole 752, and the stored energy from the spring 636 is released to urge the door assembly 718 toward its open position.

Figure 11:
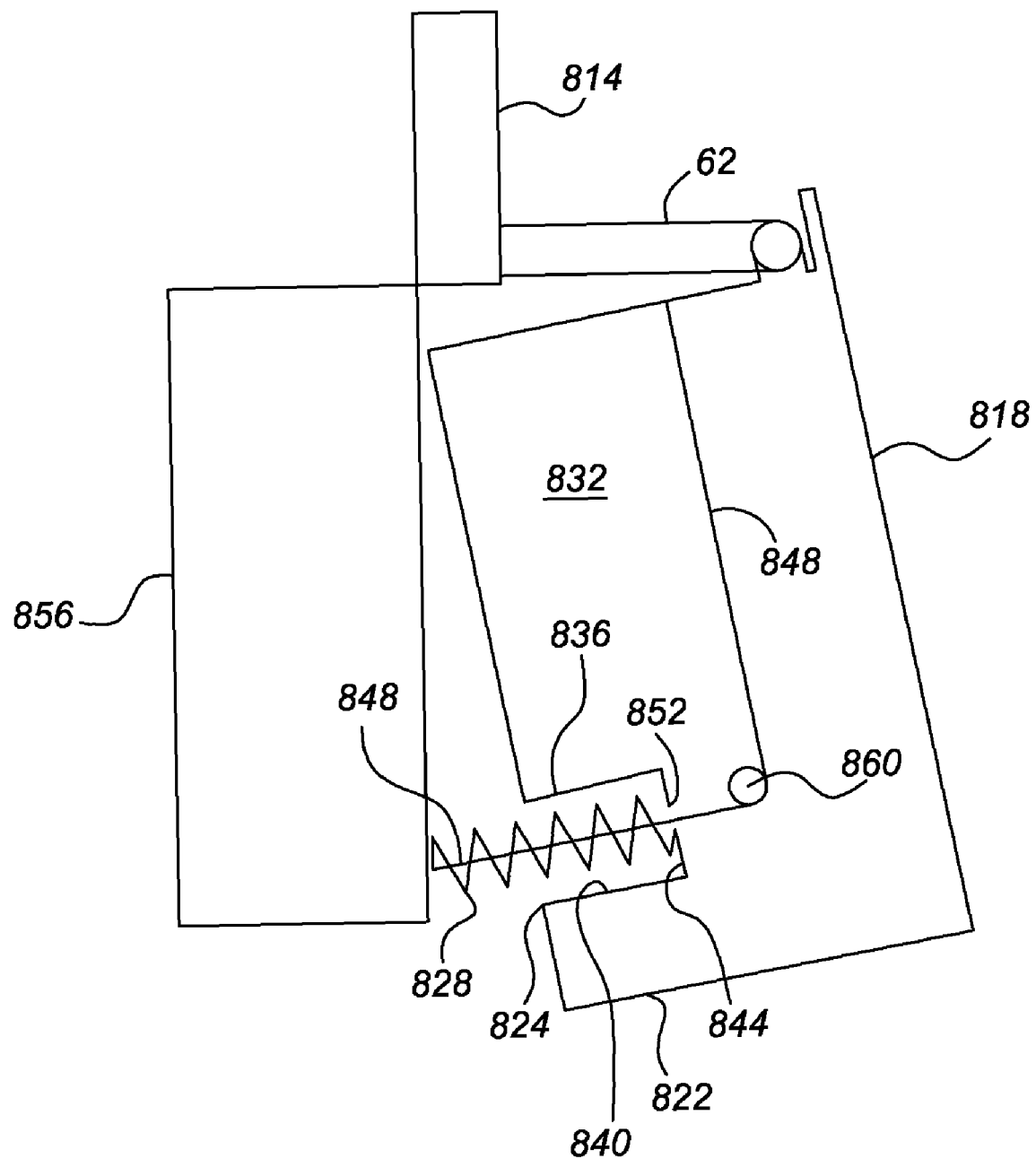
FIG. 11 is a schematic, sectional top view of another door having an alternative spring configuration for biasing the door, and an active material based actuator configured to selectively compress the spring.

Referring to FIG. 11, door assembly 818 is rotatably mounted to hinge pillar 814 via hinge 62. The inner panel 822 of the door assembly 818 defines an aperture 824. A spring 828 is disposed in the door cavity 832, and door structure defines a cylindrical spring guide 836 within the cavity 832. More specifically, the guide 836 defines a generally cylindrical cavity 840 that at least partially contains the spring 828. The cavity 840 aligns with aperture 824 at one end such that the spring 828 is selectively extendable outside the cavity 840 through the aperture 824, as shown in FIG. 11. The spring contacts a wall 844 that defines the end of the cavity 840 opposite the aperture 824.

An SMA wire 848 is disposed in the door cavity 832. One end of the wire 848 is mounted to the inner panel 822, and the other end of the wire 848 is mounted to the spring 828. More specifically, the wire 848 extends from the door cavity 832 into the cylindrical cavity 840 through an aperture 852 in the wall 844. The segment of the wire 848 in the cylindrical cavity 840 extends along the centerline of the spring 828, and the wire 848 is mounted to the distal end of the spring 828, i.e., the end of the spring 828 that is farthest from the wall 844 and closest to the vehicle body floor 856 or rocker panel. A guide pulley 860 guides the wire 848 inside the door cavity 832.

The wire 848 is characterized by a predetermined length to which the wire reverts in its hot state after being pseudo-plastically deformed. The predetermined length is such that the wire compresses the spring 828 so that the spring is entirely within the cavity 840, and no part of the spring protrudes from the aperture 824. When the wire 848 is in its cold state, its modulus is sufficiently low such that the spring 828, acting against wall 844, extends outward from the aperture 824 in the inner panel 822, thereby pseudo-plastically increasing the length of the wire 848 from its predetermined length.

During operation of the door assembly 818, the wire 848 is heated to its hot state to compress the spring 828, thereby storing energy in the spring. A latch (not shown) is engaged to maintain the spring 828 in its compressed state after the wire 848 has cooled to its cold state. When the door assembly 818 is to be opened, the latch is released, and the stored energy from the spring 828 is released as the spring 828 extends through the aperture 824 and exerts opposing forces on the wall 844 and the body floor 856 to urge the door assembly toward its open position.

Figure 12:
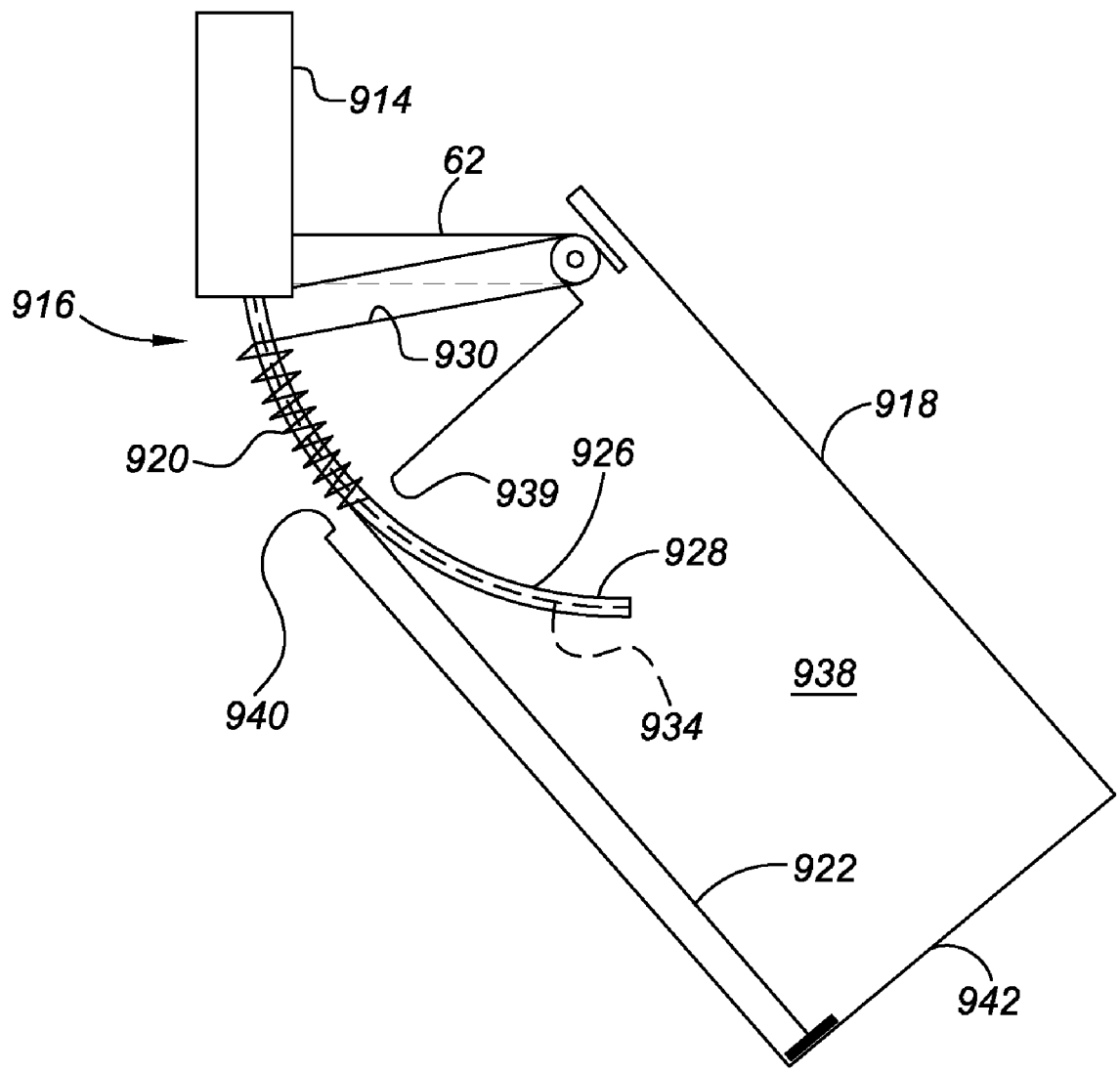
FIG. 12 is a schematic, sectional, top view of yet another door having another alternative spring configuration for biasing the door, and an active material based actuator configured to selectively compress the spring.

Referring to FIG. 12, door assembly 918 is rotatably mounted with respect to hinge pillar 914 via hinge 62. Door opening actuator 916 includes a quarter pulley member 928, a spring 920, and an SMA wire 922. The quarter pulley member 928 includes a quarter pulley portion 926 and an attachment portion 930. The attachment portion 930 is rotatably mounted with respect to the door assembly 918 and the hinge pillar 914 at the hinge 62 so that the quarter pulley member 928 is selectively rotatable about the axis of rotation of the door assembly 918. The quarter pulley portion 926 is generally horizontally oriented, curved, and, in the embodiment depicted, forms one quarter of a circle having the axis of rotation of the door at its center point. The pulley portion 926 defines a groove 934 that is open in the inboard direction, i.e., toward the vehicle body. The pulley portion 926 extends from the attachment portion outside the door cavity 938, through aperture 939 formed in the inner panel 942, and into the door cavity 938.

The spring 920 is concentrically disposed around the pulley portion 926 between the attachment portion 930 and an outer wall 940 of the inner panel 942 of the door assembly 918. The SMA wire 922 is mounted with respect to the inner panel 942 at one end, traverses the door cavity 938 and extends outside the door cavity 938 through aperture 939. Outside the door cavity 938, the SMA wire 922 extends along the pulley portion 926 inside the groove 934, and is attached to the pulley member 928 adjacent the attachment portion 930.

The SMA wire 922 is characterized by a predetermined length. When the wire 922 is in its cold state, its elastic modulus and yield strength are sufficiently low such that the spring, acting on the wall 940 of the door assembly 918 and the attachment portion 926, urges the door assembly 918 away from the attachment portion 926, thereby elongating the wire 922 from its predetermined length. When the wire 922 is heated to its hot state, the wire 922 reverts to its predetermined length and increases in modulus, thereby drawing the pulley member 928 and the door assembly 918 together and compressing the spring 920.

Thus, when the door assembly 918 is at least partially open, the wire 922 can be heated to its hot state, compressing the spring 920. The pulley member 928 rotates toward the door assembly 918 independently of the hinge pillar 914, and therefore the compression of the spring 920 does not affect the door opening angle. The door assembly 918 may then be manually rotated to its closed position, with the pulley member 928 contacting the hinge pillar 914. When the door assembly is opened (e.g., when a controller commands an electric latch (not shown) to release) with the wire 922 in its cold state, the compressed spring urges the door assembly 918 toward its open position and elongates the wire 922 from its predetermined length.

Figure 13:
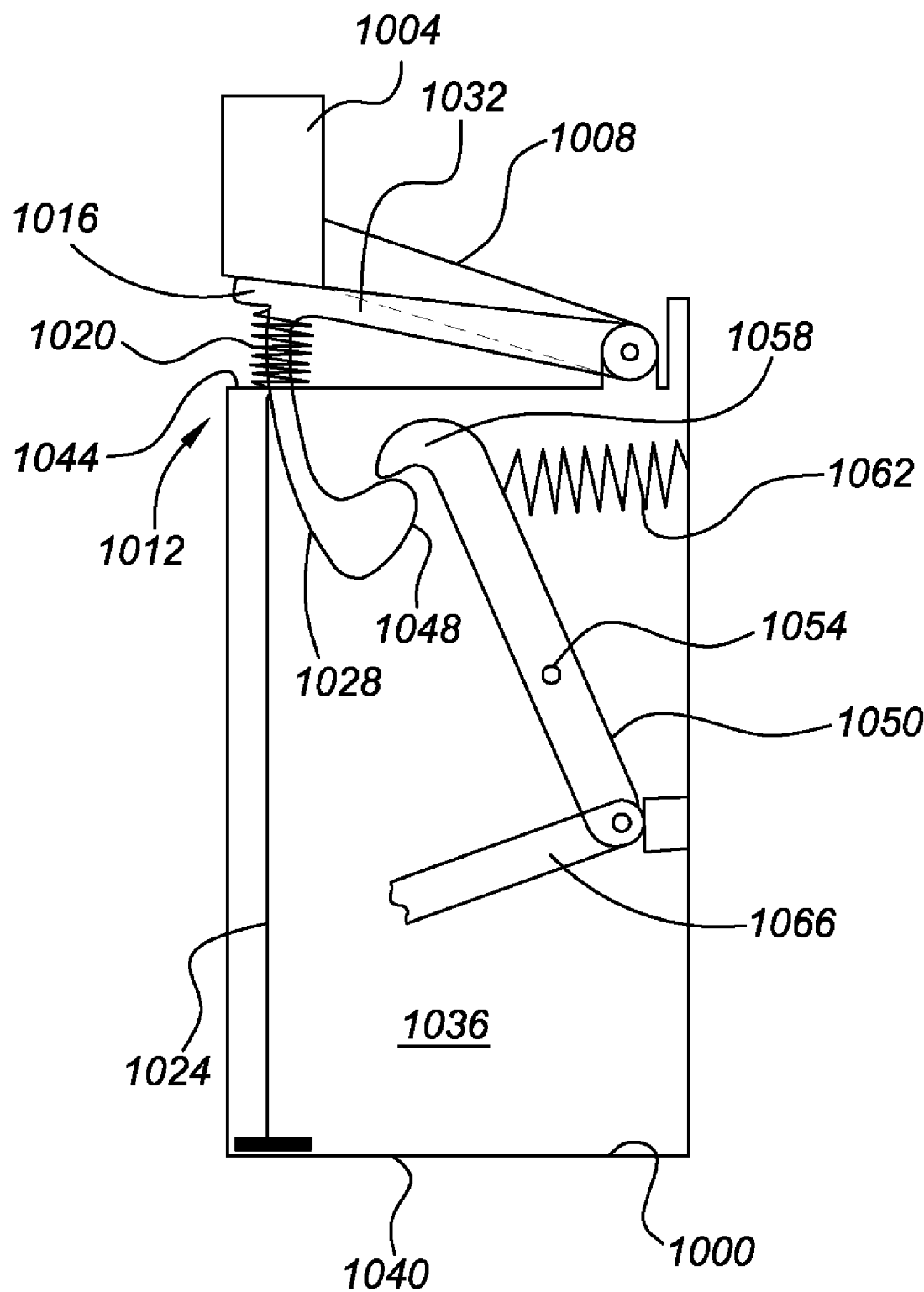
FIG. 13 is a schematic, sectional, top view of yet another door having yet another spring configuration.
Figure 14:
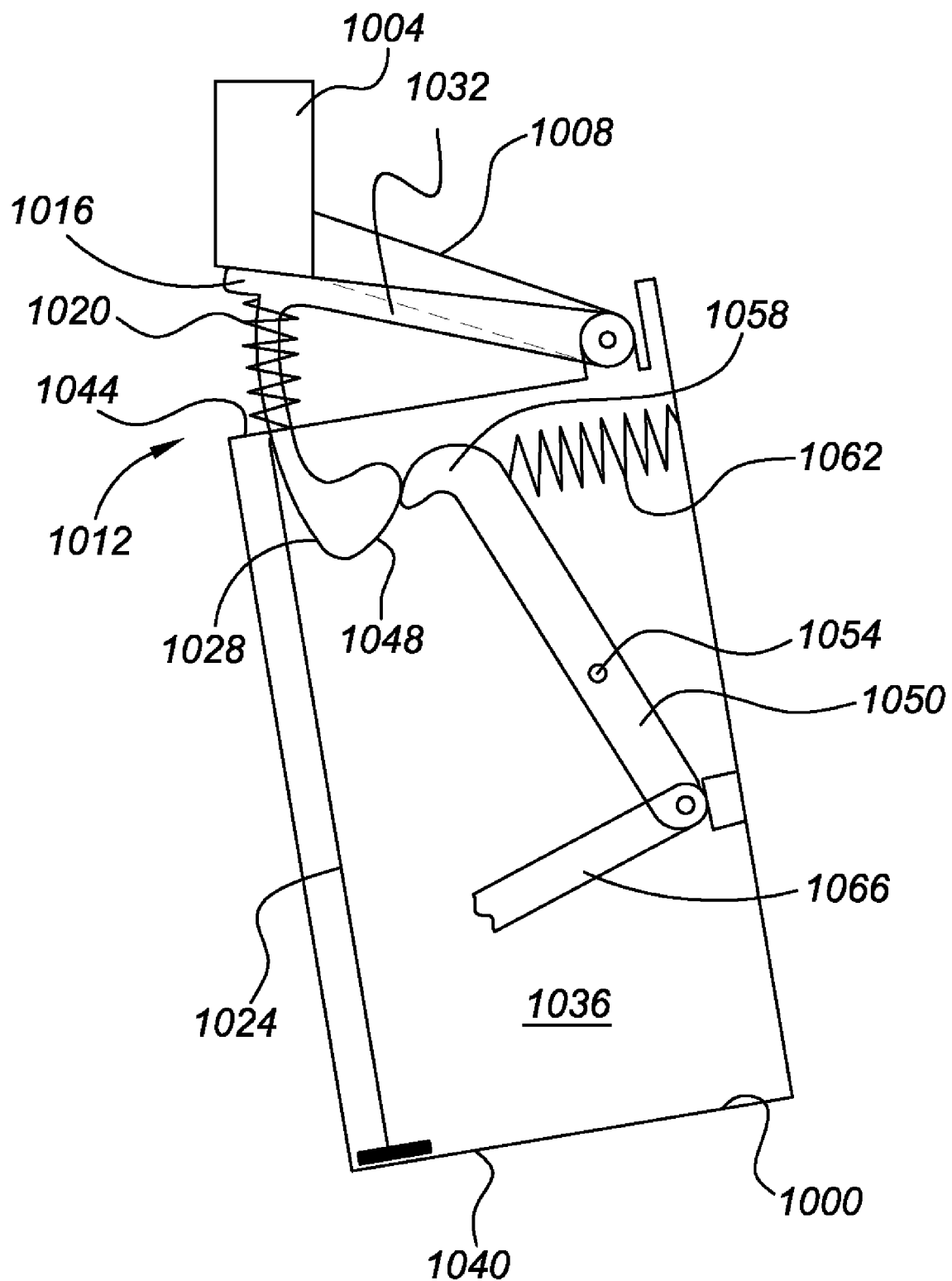
FIG. 14 is a schematic, sectional, top view of the door of FIG. 13 in a partially open position.

Referring to FIGS. 13 and 14, door assembly 1000 is rotatably mounted with respect to a vehicle body hinge pillar 1004 via hinge 1008. Door opening actuator 1012 includes a pulley member 1016, a spring 1020, and a shape memory alloy (SMA) wire 1024. The pulley member 1016 is a generally L-shaped bracket and includes a pulley portion 1028 and an attachment portion 1032. The attachment portion 1032 is rotatably mounted with respect to the door assembly 1000 and the hinge pillar 1004 at the hinge 1008 so that the pulley member 1016 is selectively rotatable about the axis of rotation of the door assembly 1000 between a first position, shown in FIG. 13, and a second position, shown in FIG. 14. The pulley portion 1028 is generally horizontally oriented and curved. The pulley portion 1028 defines a groove (not shown) that is open in the inboard direction, i.e., toward the vehicle body. The pulley portion 1028 extends from the attachment portion 1032 outside the door cavity 1036, through an aperture formed in the inner panel 1040 of the door assembly 1000, and into the door cavity 1036.

The spring 1020 is concentrically disposed around the pulley portion 1028 between the attachment portion 1032 and an outer wall 1044 of the inner panel 1040. The SMA wire 1024 is mounted with respect to the inner panel 1040 at one end, traverses the door cavity 1036 and extends outside the door cavity 1036 through the aperture formed in the inner panel 1040. Outside the door cavity 1036, the SMA wire 1024 extends along the pulley portion 1028 inside the groove, and is attached to the pulley member 1016 adjacent the attachment portion 1032. Alternatively, a cable or wire that is not SMA may be used within the groove and attached to the SMA wire 1024 at one end and to the pulley member 1016 at the other end.

The SMA wire 1024 is characterized by a predetermined length. When the wire 1024 is in its cold state, its elastic modulus and yield strength are sufficiently low such that the spring 1020, acting on the wall 1044 and the attachment portion 1032, urges the door assembly 1000 away from the attachment portion 1032, thereby elongating the wire 1024 from its predetermined length. When the wire 1024 is heated to its hot state, the wire 1024 reverts to its predetermined length and increases in modulus, thereby drawing the pulley member 1016 toward the door assembly 1000 so that the pulley member 1016 is in its first position and the spring 1020 is compressed by the wall 1044 and the attachment portion 1032.

The pulley member 1016 also includes a hook 1048 at the end of the pulley portion 1028 inside the door cavity 1036. A pawl 1050 is mounted with respect to the inner panel 1040 at pivot 1054 so that the pawl is selectively rotatable about the pivot 1054. The pawl 1050 is disposed within the door cavity 1036, and includes a hook 1058. The hook 1058 is engageable with the hook 1048 of the pulley member 1016, as shown in FIG. 13, to retain the pulley member 1016 in its first position. A spring 1062 biases the pawl 1050 into engagement with the hook 1048. The pawl 1050 is selectively rotatable about the pivot 1054 so that the hook 1058 is out of engagement with the hook 1048, thereby releasing the pulley member 1016 from its first position so that the spring 1020 can move the pulley member 1016 to its second position with respect to the door assembly 1000.

Thus, when the door assembly 1000 is at least partially open, the wire 1024 can be heated to its hot state, compressing the spring 1020 and moving the pulley member 1016 to its first position with respect to the door assembly 1000. The pulley member 1016 rotates toward the door assembly 1000 independently of the hinge pillar 1004, and therefore the compression of the spring 1020 does not affect the door opening angle. As the pulley member 1016 moves toward its first position, the spring 1062 causes the hook 1058 of the pawl 1050 to engage the hook 1048 of the member 1016. Thus, when the spring cools to its cold state, the engaged hooks 1048, 1058 prevent the spring 1020 from expanding and releasing its stored energy.

The door assembly 1000 may then be manually rotated to its closed position. A release member 1066 is operatively connected to the pawl 1050 to cause the pawl 1050 to rotate so that the hook 1058 disengages hook 1048, and the spring 1020 urges the pulley member 1016 into contact with the hinge pillar 1004; the slight movement of the pulley member 1016 into contact with the hinge pillar 1004 is sufficient to prevent the two hooks 1048, 1058 from engaging each other. When the door assembly 1000 is unlatched, the spring 1020 then urges the door assembly 1000 away from the pulley member 1016 and the hinge pillar 1004 and toward the open position.

Figure 15:
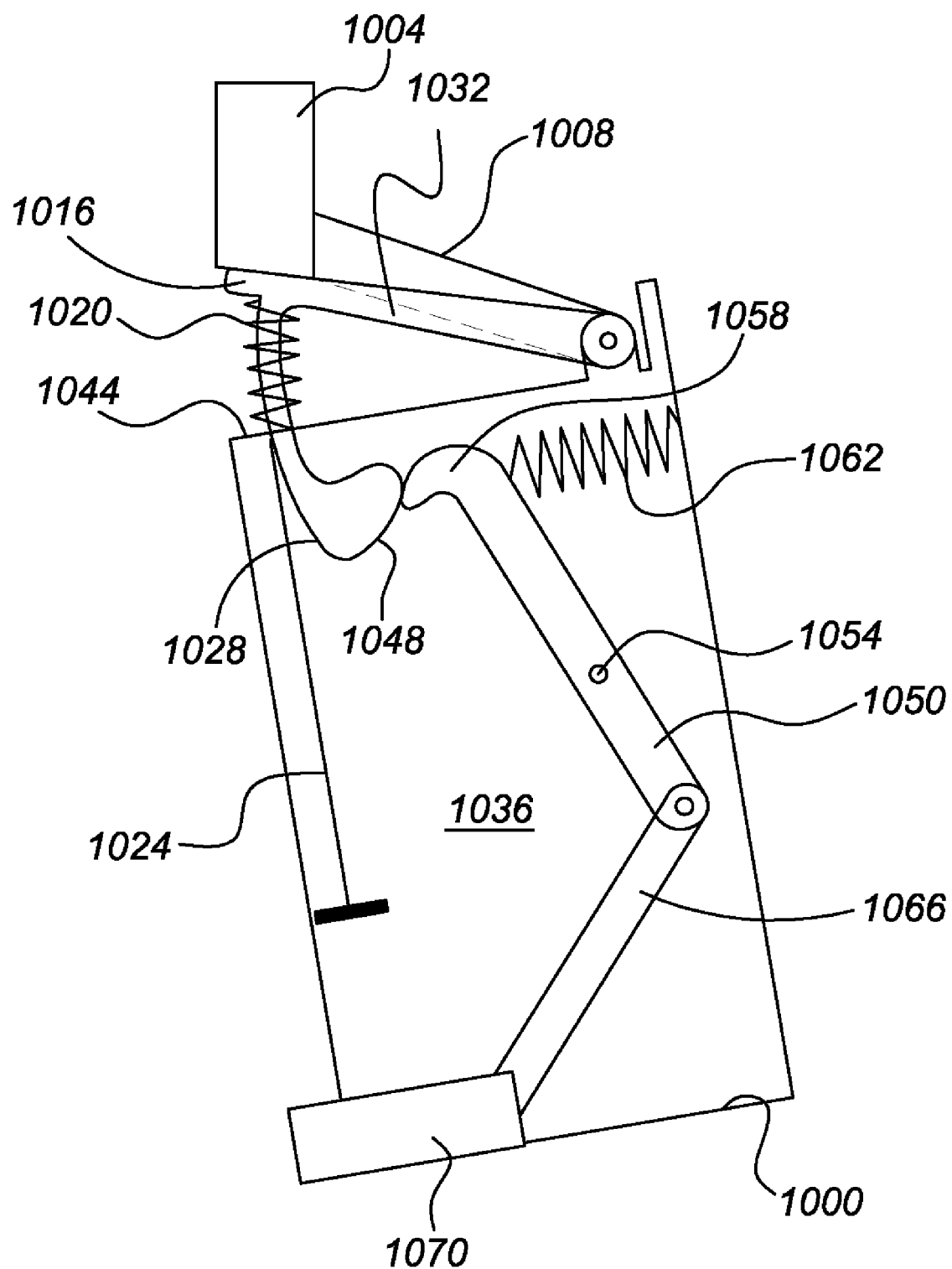
FIG. 15 is a schematic, sectional, top view of the door of FIGS. 13 and 14 having a release device.

The release member 1066, e.g., a lever or cable, may be actuated, i.e., moved to cause the movement of pawl 1050, in different ways within the scope of the claimed invention. Referring to FIG. 15, wherein like reference numbers refer to like components from FIGS. 13 and 14, the member 1066 is actuated by an actuator 1070. Actuator 1070 in an exemplary embodiment is dedicated to actuating member 1066, such as a motor, SMA wire, solenoid, etc. In a second embodiment, the actuator 1070 is a door latch release mechanism that is operatively connected to both a door latch that retains the door assembly 1000 in the closed position and the release member 1066; the door latch release mechanism may be configured to actuate member 1066 either simultaneously with, or slightly before, causing the door latch to release the door assembly 1000. Alternatively, the door latch release mechanism may use only part of its stroke to actuate the member 1066 after the door 1000 is fully closed and uses a full stroke to release the door latch when needed. The door release latch can even release more than two latches simultaneously or discretely using different amount of its stroke. In a third embodiment, a motion related to the door being fully closed is used to actuate the member 1066. For example, the movement of the spagnolet (not shown) in the door latch from the secondary to the primary position or the door movement from ajar to fully closed position may cause movement of member 1066. It may be desirable to employ a cinching latch to guarantee some amount of travel to make sure the door can be fully closed and the energy spring can be released. In a fourth embodiment, a toggle release function is employed wherein one actuation of the SMA wire 1024 causes movement of the pulley member 1016 to the first position, and a second actuation of the SMA wire moves the pawl 1050 to release the pulley member 1016. Other mechanisms may be employed to retain the pulley member 1016 in its first position; for example, the pulley member 1016 may define an aperture, and a spring-loaded pin, such as the one shown at 748 in FIG. 10, may be insertable into the aperture to retain the pulley member 1016.

Figure 16:
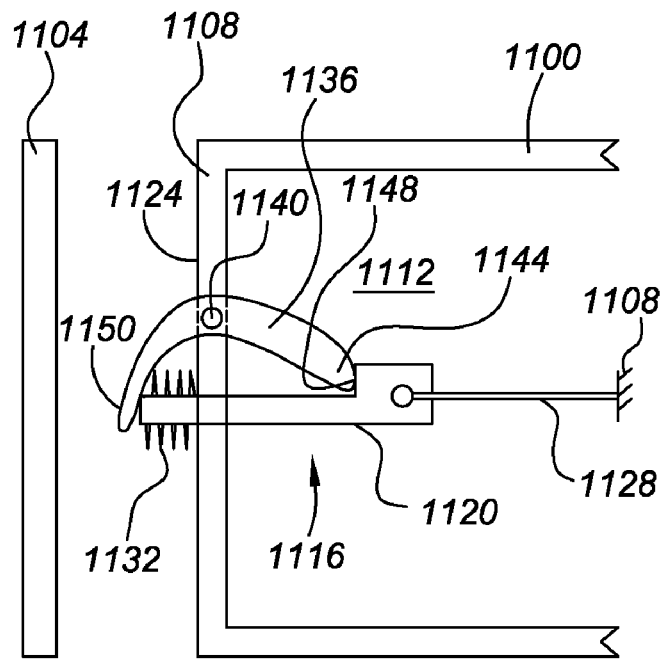
FIG. 16 is a schematic, sectional, side view of a door in an open position and including yet another spring configuration and active material based actuator configured to compress the spring.
Figure 17:
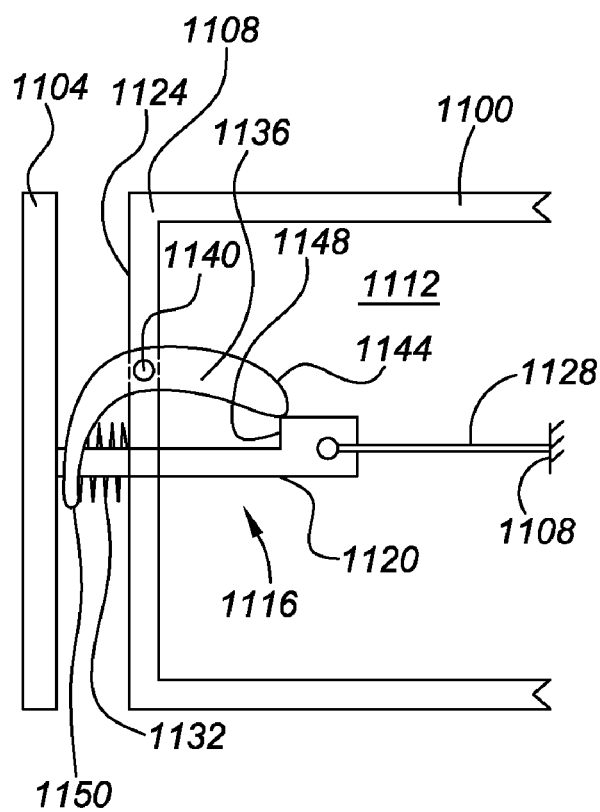
FIG. 17 is a schematic, sectional side view of the door of FIG. 16 in a closed position.

Referring to FIGS. 16 and 17, a door assembly 1100 is rotatably mounted with respect to a vehicle body hinge pillar 1104 via at least one hinge (not shown), and is selectively rotatable about the at least one hinge between an open position (shown in FIG. 16) and a closed position (shown in FIG. 17). The door assembly 1100 includes an inner panel 1108 that cooperates with an outer panel (not shown) to define a door cavity 1112. A door opening actuator 1116 includes a bar 1120 that extends from inside the door cavity 1112, through an aperture in the inner panel 1108, and into the space between an outer wall 1124 of the inner panel 1108 and the hinge pillar 1104.

The door opening actuator 1116 further includes an SMA wire 1128 that traverses a portion of the door cavity 1112, and that is mounted to the inner panel 1108 at one end and to the bar 1120 at the other end. A spring 1132 concentrically surrounds the bar 1120 outside the door cavity 1112, between the hinge pillar 1104 and the wall 1124 of the inner panel 1108. The end of the spring 1132 that is distal from the wall 1124 is mounted to the bar 1120.

The SMA wire 1128 is characterized by a predetermined length. When the wire 1128 is in its cold state, its elastic modulus and yield strength are sufficiently low such that the spring 1132, acting on the wall 1124 of the door assembly 1100 and the end of the bar 1120, urges the bar 1120 out of the door cavity 1112, thereby elongating the wire 1128 from its predetermined length. When the wire 1128 is heated to its hot state, the wire 1128 reverts to its predetermined length and increases in modulus, thereby drawing the bar 1120 into the door cavity 1112 so that the spring 1132 is compressed against the wall 1124.

A pawl 1136 is selectively rotatable about a pivot 1140. When the wire 1128 is heated to its predetermined shape, the bar 1120 is sufficiently positioned for one end 1144 of the pawl 1136 to engage a notch 1148 in the bar 1120, thereby preventing the compressed spring 1132 from moving the bar 1120 from the position shown in FIG. 16, even when the wire 1128 has cooled to its cold state.

The pawl 1136 is sufficiently sized and positioned such that, when it engages the notch 1148 in the bar 1120, the opposite end 1150 of the pawl 1136 extends closer to the hinge pillar 1104 than the bar 1120. Thus, when the door assembly 1100 is moved to its closed position with the pawl 1136 engaging the notch 1148, the end 1150 of the pawl 1136 contacts the hinge pillar 1104 before the bar 1120 contacts the hinge pillar 1104. The reaction force exerted by the hinge pillar 1104 on the end 1150 of the pawl 1136 causes the pawl 1136 to rotate about pivot 1140 out of engagement with the notch 1148, as shown in FIG. 17.

Referring specifically to FIG. 17, when the pawl 1136 does not engage the notch 1148, and the SMA wire 1128 has cooled to its cold state, the spring 1132 urges the bar 1120 out of the cavity 1112 until the bar 1120 contacts the hinge pillar 1104. When the door is unlatched, the compressed spring 1132 acts on the wall 1124 to urge the door assembly 1100 toward its open position, as shown in FIG. 16. When the door assembly 1100 is in the open position, and the wire 1128 is heated to its hot state, the pawl 1136 enagages the notch 1148.

The pawl 1136 may be configured such that gravity urges the pawl 1136 into engagement with the notch 1148, or a spring (not shown) may move the pawl 1136 into engagement with the notch 1148.

If a check link is used with the door assemblies of FIGS. 13-17, then it may be desirable to modify the check link such that the tendency of the check link to close the door is less than the tendency of the springs 1020, 1132 to open the door; this may be accomplished by modifying the profile of the check link. The pawl 1136 configuration of FIGS. 16 and 17 may also be employed to retain the pulley member 1016 of FIGS. 13-15 in its first position, thereby replacing pawl 1050. Although the pulley member 1016 in FIGS. 13-15 and the bar 1120 in FIGS. 16 and 17 rotate with respect to the same axis as their respective door assemblies, the axes of rotation of members 1016, 1120 may be offset to the axis of rotation of their respective door assemblies within the scope of the claimed invention.

Figure 18:
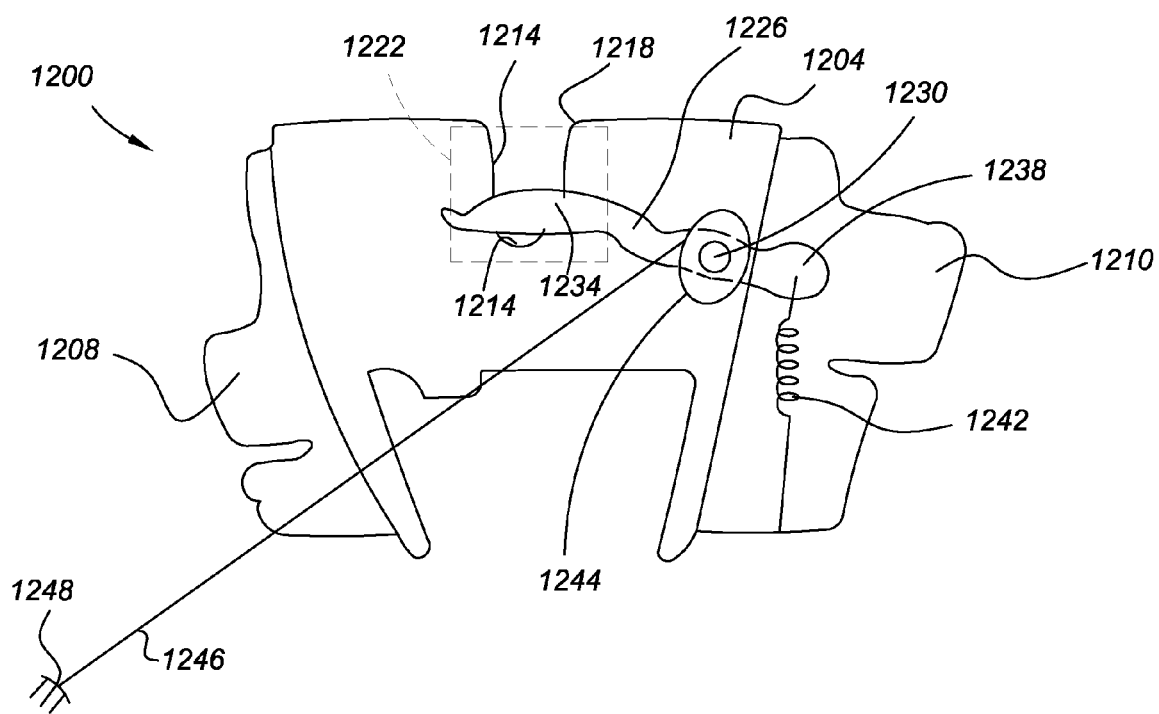
FIG. 18 is a schematic, side view of a latch system configured to selectively urge a door toward its open position and having an active materials based reset system.

Referring to FIG. 18, an assembly 1200 for latching a closure (not shown) that is rotatable about a horizontal axis is schematically depicted. Exemplary closures rotatable about a horizontal axis include hoods, rear decklids (i.e., trunk closures), hatches, etc. The assembly 1200 includes a structural member 1204 that includes two flanges 1208, 1210 for mounting the member 1204 with respect to a vehicle body. The member 1204 also defines a striker slot 1214 that is open at one end 1218. The member 1204 is mounted at a rear panel or wall of a trunk or other rear storage compartment such that the striker slot 1214 is upwardly open to receive a striker (not shown) mounted to the closure. A latch 1222 is mounted with respect to the member 1204 such that the latch 1222 receives the striker when then striker enters the slot 1214, and includes a spagnolet (not shown) to engage the striker, as understood by those skilled in the art. Thus, when the closure is moved to its closed position, the striker is characterized by a path through the slot 1214 that it follows wherein the striker enters the slot 1214 throught the open end 1218 and travels through the slot until it engages the latch 1222, which engages the striker as understood by those skilled in the art.

The assembly 1200 also includes an arm 1226 that is pivotably connected to the member 1204 at a pivot 1230. The arm 1226 is selectively pivotable about the pivot between a first position (as shown in FIG. 18) and a second position. When the arm 1226 is in its first position, a portion 1234 of the arm 1226 crosses the path of the striker through the slot 1214; when the arm 1226 is in its second position, the arm 1226 either does not cross the path of the striker, or crosses the path of the striker closer to the end of the path, i.e., the position of the striker when it is fully engaged with the latch 1222, than in the first position of the arm 1226. A portion 1238 of the arm 1226 on the opposite side of the pivot 1230 from portion 1234 is connected to a spring 1242. The spring 1242 interconnects portion 1238 and the member 1204.

A pulley 1244 is mounted with respect to the arm 1226 and is selectively rotatable about the pivot 1230. An SMA wire 1246 is wound around the pulley 1244 at one end, and is mounted with respect to the vehicle body 1248 at the other end. The SMA wire 1246 is characterized by a predetermined length. When the wire 1246 is heated to its hot state, it reverts to its predetermined length, i.e., it decreases in length, thereby causing the pulley 1244, and correspondingly, the arm 1226, to rotate about the pivot 1230 (counterclockwise as seen in FIG. 10) to the second position in which portion 1234 of the arm 1226 does not substantially extend across the slot 1214 and is not substantially in the path of a striker travelling through the slot 1214 while engaging the latch 1222. When the arm 1226 rotates from its first position to its second position, it elongates the spring 1242; the spring 1242 is thus in tension when the arm 1226 is in its second position and urges the arm 1226 back to its first position.

Accordingly, by heating the wire 1246 and thereby moving the arm 1226 to its second position, the effort required to move the closure to its closed position is reduced because the striker does not encounter the arm 1226 in its path to the latch 1222, or encounters the arm 1226 later in its path to the latch 1222, and thus the spring 1242 does not resist movement of the striker through its path, or resists movement of the striker through a smaller portion of its path than when the arm 1226 is in its first position. After the striker has engaged the latch 1222, the wire 1246 cools to its cold state. When the wire 1246 is in its cold state, the modulus of the wire 1246 is sufficiently low that the force exerted by the spring 1242 on the arm 1226 is sufficient to pseudo-plastically strain the wire 1246 so that it is longer than its predetermined length. That is, the spring 1242 urges the arm 1226 to rotate toward its first position from its second position, which in turn causes the pulley 1244 to rotate, thereby pseudo-plastically elongating the wire 1246. The force of the spring 1242 on the arm 1226 is sufficient to rotate the arm 1226 such that portion 1234 contacts the striker. The spring 1242 is still stretched when the arm 1226 contacts the striker, and biases the portion 1234 against the striker so that when the latch is released, the arm 1226 urges the striker, and therefore the closure, to the closure's open position.

Figure 19:
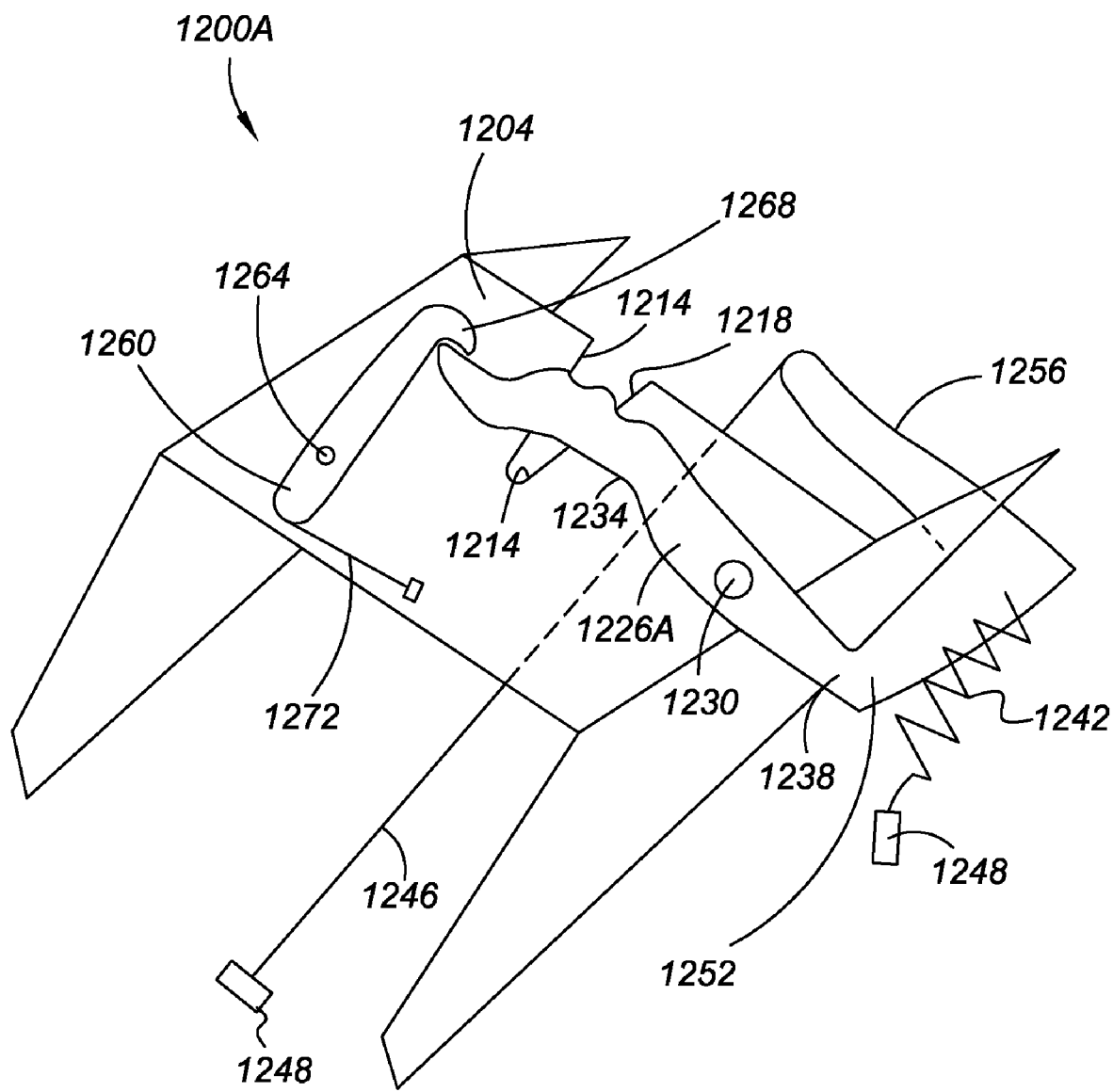
FIG. 19 is a schematic, perspective view of another latch system configured to selectively urge a door toward its open position and having an active materials based reset system.

Referring to FIG. 19, wherein like reference numbers refer to like components from FIG. 18, an alternative assembly 1200A for latching a closure that is rotatable about a horizontal axis is schematically depicted. A lever 1256 is operatively connected to the arm 1226A by a connecting arm 1252. Connecting arm 1252 connects lever 1256 to the arm 1226A for rotation with the arm 1226A about the pivot 1230. In the embodiment depicted, lever 1256 is generally parallel to portion 1238, but other configurations may be employed within the scope of the claimed invention.

Wire 1246 is mounted at one end to lever 1256, and thus heating of the wire 1246 to its hot state will cause the lever 1256, and the arm 1226A, to rotate about pivot 1230 to its second position from its first position. Assembly 1200A also includes a pawl 1260 that is pivotably connected to member 1204 at a pivot 1264. The pawl 1260 includes a hook portion 1268 that is configured to enagage the end of portion 1234 when the arm 1226A is in the second position. It should be noted that the pawl 1260 is shown engaging the arm 1226A with the arm in the first position in FIG. 19, but the pawl 1260 preferably engages the arm 1226A when the arm is in its second position.

Thus, after the wire 1246 is heated and the arm 1226A moves to its second position, the pawl 1260 engages the arm 1226A to retain the arm in its second position. A spring (not shown) preferably biases the pawl 1260 into engagement with the arm 1226A. An SMA wire 1272 is mounted to the member 1204 at one end and to the pawl 1260 at the other end. Heating the wire 1272 causes the wire 1272 to exert a force on the pawl 1260 such that the pawl 1260 pivots about pivot 1264 out of engagement with the arm 1226A, thereby enabling the spring 1242 to urge the arm 1226A toward the open position and into contact with the striker in the slot 1214.

Accordingly, wire 1246 may be heated prior to movement of the closure to its closed position; pawl 1260 retains the arm 1226A in its second position, even after wire 1246 has cooled to its cold state. After the striker has engaged the latch, wire 1272 may be heated to release the arm 1226A from the pawl and into engagement with the striker.

In another embodiment (not shown), a whole or partial pulley can also replace part or the whole lever 1256 and reside inside the plane of the rear panel of the vehicle body to offer a constant moment arm. In another embodiment (not shown), the pawl 1260 can be located between the striker slot 1214 and the common rotation axis 1230 for the two levers 1226A, 1256. In still another embodiment (not shown) the tension spring 1242 can also be placed out of the plane of the rear panel.

In yet another alternative embodiment, a toggling latch/release mechanism (not shown), similar to those used in certain retractable ballpoint pens, is employed such that actuating the SMA wire 1246 once the spring 1242 is stretched and toggled to be latched; actuating the SMA wire 1246 a second time causes the spring 1242 to be toggled to be released.

The pawl 1260, may be actuated, i.e., moved to disengage the pawl 1260 from the arm 1226A, in different ways within the scope of the claimed invention. In a first embodiment, the pawl 1260 is actuated by an actuator that is dedicated to actuating pawl 1260, such as a motor, SMA wire, solenoid, etc. In a second embodiment, the pawl 1260 is actuated by a latch release mechanism that is operatively connected to both the latch (shown at 1222 in FIG. 18) and the pawl 1260; the latch release mechanism may be configured to actuate pawl 1260 either simultaneously with, or slightly before, causing the latch 1222 to release the striker. Alternatively, the latch release mechanism may use only part of its stroke to actuate the pawl 1260 after the closure is fully closed and uses a full stroke to release the latch 1222 when needed. The latch release mechanism can even release more than two latches simultaneously or discretely using different amount of its stroke. In a third embodiment, a motion related to the closure being fully closed is used to actuate the pawl 1260. For example, the movement of the spagnolet (not shown) in the latch 1222 from the secondary to the primary position or the closure movement from ajar to fully closed position may cause movement of pawl 1260. It may be desirable to employ a cinching latch to guarantee some amount of travel to make sure the closure can be fully closed and the energy spring can be released.

Referring to FIGS. 20A-20D, wherein like reference numbers refer to like components from FIGS. 18-19, assembly 1200B includes arm 1226, which is mounted to the member 1204 as shown in FIG. 19 at pivot 1230. Arm portion 1238 is mounted to one end of the spring 1242. A cam 1280 is eccentrically connected to a pivot 1284 for selective rotation with respect to the member shown at 1204 in FIG. 19. Cam 1280 includes a lobe portion 1286. SMA wire 1288 is connected to the cam 1280 at one end and is connected to the member 1204 or the rear panel/wall at the other end. SMA wire 1292 is connected to the cam 1280 at one end and is connected to the member 1204 at the other end.

The arm 1226 is shown in its first position in FIG. 20A. Heating wire 1288 to its hot state causes the wire 1288 to decrease in length so that the SMA wire 1288 exerts a force on the cam 1280 to cause the cam 1280 to rotate about pivot 1284 (counterclockwise in the Figures) such that the lobe 1286 contacts the arm 1226 and causes the arm to rotate to an intermediate position shown in FIG. 20B and then to its second position as shown in FIG. 20C. After wire 1288 has cooled to its cold state, the wire 1292 is heatable to its hot state to cause the wire 1292 to decrease in length, causing the wire 1292 to exert a force on the cam 1280 that causes the cam 1280 to rotate (clockwise in the Figures) through the intermediate position shown in FIG. 20D to its position shown in FIG. 20A. The end of lobe 1286 that contacts the arm 1226 when the arm is in the second position is flat. The cam 1280 acts as a lock when the arm 1226 is in the second position, and as a stop when the arm 1226 is in the first position. In this embodiment, cam 1280 and wires 1288, 1292 are coplanar and thus minimize packaging space. In an alternative embodiment, the wire 1292 is replaced by a coil spring and the arm 1226 is still partially crossing the path of the striker through the slot 1214 at FIG. 20C such that the end travel of the closure during closing will move the arm 1226 a little past the second position and therefore the cam can be moved by the spring back to the position shown in FIG. 20A.

In an alternative embodiment, the cam 1280 is shaped so that a single SMA wire could fully operate the device. Assuming the device operates as described to the position in FIG. 20C, if the cam is shaped properly and the wire (1288) is attached and sized properly so that it still has some stroke left, it could be activated again to rotate the cam 1280 a bit more in the counter-clockwise direction. Once past the flat portion of the cam, its lobe shape could be such that the spring force is sufficient to return the cam to the position shown in FIG. 20A, basically rotating the cam 1280 in a single direction to both compress and release the arm 1226.

Figure 21:
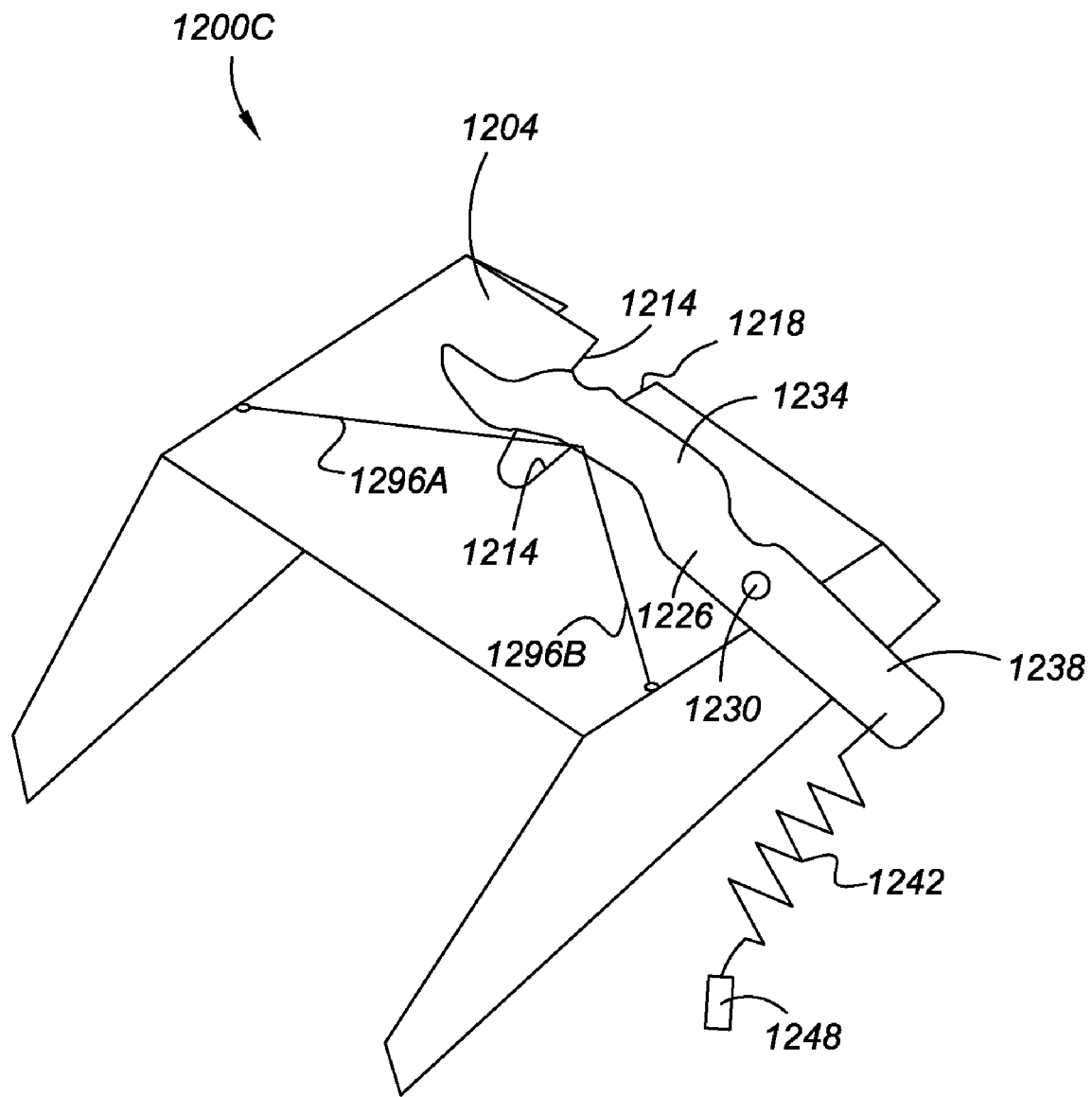
FIG. 21 is a schematic perspective view of a latch system having another alternative active materials based reset mechanism.

Referring to FIG. 21, wherein like reference numbers refer to like components from FIGS. 18-20D, assembly 1200C includes two SMA wires 1296A, 1296B. Wire 1296A is mounted to the structural member 1204 at one end and is mounted to the arm 1226 at the other end. Wire 1296B is mounted to the structural member 1204 at one end and is mounted to the arm at the other end. Wires 1296A and 1296B are mounted to the arm 1226 at substantially the same location on the arm 1226, and are mounted to the structural member 1204 such that the wires 1296A, 1296B form an obtuse angle.

Figure 22:
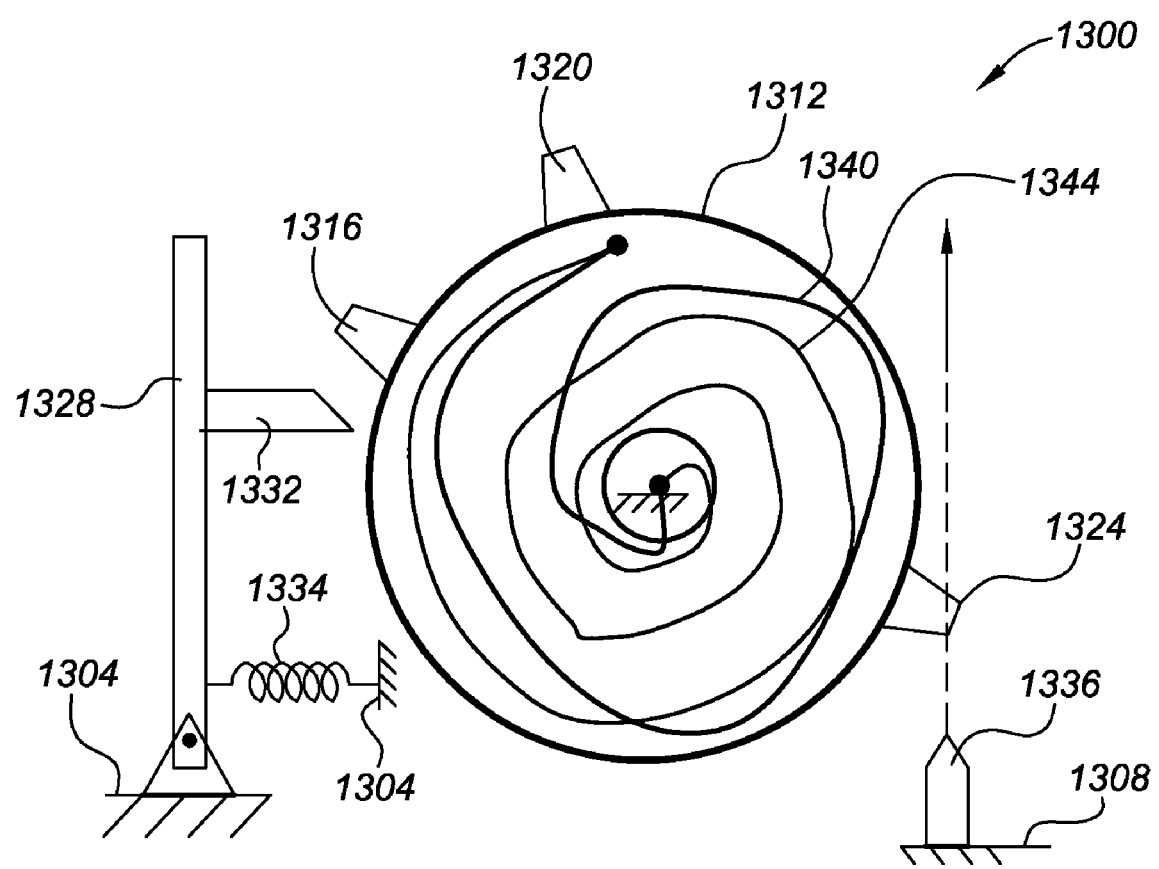
FIG. 22 is a schematic depiction of a door latch having an active material member to urge a door toward its open position.

Referring to FIG. 22, a latch system 1300 for a door 1304 is schematically depicted. The door 1304 is selectively rotatable with respect to a vehicle body structural member 1308. The latch 1300 includes a member 1312 that is mounted with respect to the door 1304 and selectively rotatable with respect to the door 1304 about its center. The member 1312 carries two ratchet teeth 1316, 1320 and a protrusion 1324. The latch also includes a pawl 1328 having a protrusion 1332. The latch 1300 is mounted to the door 1304 such that when the door 1304 is closed, protrusion 1324 contacts a striker 1336 mounted to the vehicle body structural member 1308. Contact between the protrusion 1324 and the striker 1336 causes rotation of the member 1312 with respect to the door 1304.

As member 1312 rotates, teeth 1316, 1320 rotate into engagement with the protrusion 1332 of pawl 1328. Pawl 1328 is pivotable with respect to the door 1304 to permit selective engagement and disengagement of the pawl 1328 and the teeth 1316, 1320. A spring 1334 biases the pawl 1328 to maintain engagement between the pawl 1328 and the teeth 1316, 1320.

The latch 1300 includes a spring 1340 and an SMA spring 1344 that are configured to be strained when the striker 1336 rotates member 1312. When the door 1304 is closed and the SMA spring 1344 is in its cold state, the modulus of the spring 1344 is sufficiently low to prevent undue effort to close the door. By applying a thermal activation signal to the spring 1344 to heat the spring 1344 to its hot state, the pseudo-plastic strain is removed from the spring 1344, and the spring 1344 thus assists in moving the door 1304 to its open position when the pawl 1328 is released. That is, the spring 1344 causes rotation of the member 1312 such that the protrusion 1324 acts on the striker 1336, which in turn causes a reaction force that urges the door 1304 toward its open position.

It may be desirable for an SMA wire to be operatively connected to members such as door inner panels, etc., via a spring so that the spring can accommodate the force of the SMA wire reverting to its predetermined shape in the event that an object blocks the opening of the door.

The embodiments depicted herein are in the context of a vehicle door, i.e., a closure. However, it should be noted that any door system may be employed within the scope of the claimed invention. For example, and within the scope of the claimed invention, a "door" may be any closure or swing panel such as a door for a toaster oven, a door for a recreational vehicle, a door for a kitchen cabinet, a vehicle hood, a decklid, a hatch, a tailgate, a cover, a door within a residential or commercial building, etc. Similarly, and within the scope of the claimed invention, a "structural member" may be, for example, a vehicle body or component thereof, such as a hinge pillar, rocker, etc., a doorframe or wall of a building, structure defining a kitchen cabinet, the housing of a toaster oven, etc.

A number of exemplary embodiments of active material door opening actuator assemblies are described herein. The active material actuator assemblies as described herein employ shape memory alloy wires. However, other active materials may be employed within the scope of the claimed invention. For example, other shape memory materials may be employed. Shape memory materials, a class of active materials, also sometimes referred to as smart materials, refer to materials or compositions that have the ability to remember their original shape, which can subsequently be recalled by applying or removing an external stimulus (i.e., an activation signal). Thus, deformation of a shape memory material from its original shape can be a temporary condition.

Exemplary shape memory materials include shape memory alloys (SMAs), electroactive polymers (EAPs) such as dielectric elastomers, piezoelectric polymers and shape memory polymers (SMPs), magnetic shape memory alloys (MSMA), shape memory ceramics (SMCs), baroplastics, piezoelectric ceramics, magnetorheological (MR) elastomers, composites of the foregoing shape memory materials with non-shape memory materials, and combinations comprising at least one of the foregoing shape memory materials. The EAPs, piezoceramics, baroplastics, and the like can be employed in a similar manner as the shape memory alloys described herein, as will be appreciated by those skilled in the art in view of this disclosure.

In the present disclosure, most embodiments include shape memory wires; however, shape memory materials and other active materials may be employed in a variety of other forms within the scope of the claimed invention, such as strips, sheets, slabs, foam, cellular and lattice structures, helical or tubular springs, braided cables, tubes or combinations comprising at least one of the forgoing forms can be employed in a similar manner as will be appreciated by those skilled in the art in view of this disclosure.

Suitable shape memory alloys can exhibit a one-way shape memory effect, an intrinsic two-way effect, or an extrinsic two-way shape memory effect depending on the alloy composition and processing history. The two phases that occur in shape memory alloys are often referred to as martensite and austenite phases. The martensite phase is a relatively soft and easily deformable phase of the shape memory alloys, which generally exists at lower temperatures. The austenite phase, the stronger phase of shape memory alloys, occurs at higher temperatures. Shape memory materials formed from shape memory alloy compositions that exhibit one-way shape memory effects do not automatically reform, and depending on the shape memory material design, will likely require an external mechanical force to reform the shape orientation that was previously exhibited. Shape memory materials that exhibit an intrinsic shape memory effect are fabricated from a shape memory alloy composition that will automatically reform themselves.

The temperature at which the shape memory alloy remembers its high temperature form when heated can be adjusted by slight changes in the composition of the alloy and through heat treatment. In nickel-titanium shape memory alloys, for example, it can be changed from above about 100° C. to below about −100° C. The shape recovery process occurs over a range of several degrees and the start or finish of the transformation can be controlled to within a few degrees depending on the desired application and alloy composition. The mechanical properties of the shape memory alloy vary greatly over the temperature range spanning their transformation, typically providing the shape memory material with shape memory effects as well as high damping capacity. The inherent high damping capacity of the shape memory alloys can be used to further increase the energy absorbing properties.

Suitable shape memory alloy materials include without limitation nickel-titanium based alloys, indium-titanium based alloys, nickel-aluminum based alloys, nickel-gallium based alloys, copper based alloys (e.g., copper-zinc alloys, copper-aluminum alloys, copper-gold, and copper-tin alloys), gold-cadmium based alloys, silver-cadmium based alloys, indium-cadmium based alloys, manganese-copper based alloys, iron-platinum based alloys, iron-platinum based alloys, iron-palladium based alloys, and the like. The alloys can be binary, ternary, or any higher order so long as the alloy composition exhibits a shape memory effect, e.g., change in shape orientation, damping capacity, and the like.

Other suitable active materials are shape memory polymers. Similar to the behavior of a shape memory alloy, when the temperature is raised through its transition temperature, the shape memory polymer also undergoes a change in shape orientation. Dissimilar to SMAs, raising the temperature through the transition temperature causes a substantial drop in modulus. While SMAs are well suited as actuators, SMPs are better suited as "reverse" actuators. That is, by undergoing a large drop in modulus by heating the SMP past the transition temperature, release of stored energy blocked by the SMP in its low temperature high modulus form can occur. To set the permanent shape of the shape memory polymer, the polymer must be at about or above the Tg or melting point of the hard segment of the polymer. "Segment" refers to a block or sequence of polymer forming part of the shape memory polymer. The shape memory polymers are shaped at the temperature with an applied force followed by cooling to set the permanent shape. The temperature necessary to set the permanent shape is preferably between about 100° C. to about 300° C. Setting the temporary shape of the shape memory polymer requires the shape memory polymer material to be brought to a temperature at or above the Tg or transition temperature of the soft segment, but below the Tg or melting point of the hard segment. At the soft segment transition temperature (also termed "first transition temperature"), the temporary shape of the shape memory polymer is set followed by cooling of the shape memory polymer to lock in the temporary shape. The temporary shape is maintained as long as it remains below the soft segment transition temperature. The permanent shape is regained when the shape memory polymer fibers are once again brought to or above the transition temperature of the soft segment. Repeating the heating, shaping, and cooling steps can reset the temporary shape. The soft segment transition temperature can be chosen for a particular application by modifying the structure and composition of the polymer. Transition temperatures of the soft segment range from about −63° C. to above about 120° C.

Shape memory polymers may contain more than two transition temperatures. A shape memory polymer composition comprising a hard segment and two soft segments can have three transition temperatures: the highest transition temperature for the hard segment and a transition temperature for each soft segment.

Most shape memory polymers exhibit a "one-way" effect, wherein the shape memory polymer exhibits one permanent shape. Upon heating the shape memory polymer above the first transition temperature, the permanent shape is achieved and the shape will not revert back to the temporary shape without the use of outside forces. As an alternative, some shape memory polymer compositions can be prepared to exhibit a "two-way" effect. These systems consist of at least two polymer components. For example, one component could be a first cross-linked polymer while the other component is a different cross-linked polymer. The components are combined by layer techniques, or are interpenetrating networks, wherein two components are cross-linked but not to each other. By changing the temperature, the shape memory polymer changes its shape in the direction of the first permanent shape of the second permanent shape. Each of the permanent shapes belongs to one component of the shape memory polymer. The two permanent shapes are always in equilibrium between both shapes. The temperature dependence of the shape is caused by the fact that the mechanical properties of one component ("component A") are almost independent from the temperature in the temperature interval of interest. The mechanical properties of the other component ("component B") depend on the temperature. In one embodiment, component B becomes stronger at low temperatures compared to component A, while component A is stronger at high temperatures and determines the actual shape. A two-way memory device can be prepared by setting the permanent shape of component A ("first permanent shape"); deforming the device into the permanent shape of component B ("second permanent shape") and fixing the permanent shape of component B while applying a stress to the component.

Similar to the shape memory alloy materials, the shape memory polymers can be configured in many different forms and shapes. The temperature needed for permanent shape recovery can be set at any temperature between about −63° C. and about 120° C. or above. Engineering the composition and structure of the polymer itself can allow for the choice of a particular temperature for a desired application. A preferred temperature for shape recovery is greater than or equal to about −30° C., more preferably greater than or equal to about 0° C., and most preferably a temperature greater than or equal to about 50° C. Also, a preferred temperature for shape recovery is less than or equal to about 120° C., more preferably less than or equal to about 90° C., and most preferably less than or equal to about 70° C.

Suitable shape memory polymers include thermoplastics, thermosets, interpenetrating networks, semi-interpenetrating networks, or mixed networks. The polymers can be a single polymer or a blend of polymers. The polymers can be linear or branched thermoplastic elastomers with side chains or dendritic structural elements. Suitable polymer components to form a shape memory polymer include, but are not limited to, polyphosphazenes, poly(vinyl alcohols), polyamides, polyester amides, poly(amino acid)s, polyanhydrides, polycarbonates, polyacrylates, polyalkylenes, polyacrylamides, polyalkylene glycols, polyalkylene oxides, polyalkylene terephthalates, polyortho esters, polyvinyl ethers, polyvinyl esters, polyvinyl halides, polyesters, polylactides, polyglycolides, polysiloxanes, polyurethanes, polyethers, polyether amides, polyether esters, and copolymers thereof. Examples of suitable polyacrylates include poly(methyl methacrylate), poly(ethyl methacrylate), poly(butyl methacrylate), poly(isobutyl methacrylate), poly(hexyl methacrylate), poly(isodecyl methacrylate), poly(lauryl methacrylate), poly(phenyl methacrylate), poly(methyl acrylate), poly(isopropyl acrylate), poly(isobutyl acrylate) and poly(octadecyl acrylate). Examples of other suitable polymers include polystyrene, polypropylene, polyvinyl phenol, polyvinylpyrrolidone, chlorinated polybutylene, poly(octadecyl vinyl ether) ethylene vinyl acetate, polyethylene, poly(ethylene oxide)-poly (ethylene terephthalate), polyethylene/nylon (graft copolymer), polycaprolactones-polyamide (block copolymer), poly (caprolactone) dimethacrylate-n-butyl acrylate, poly (norbomyl-polyhedral oligomeric silsequioxane), polyvinylchloride, urethane/butadiene copolymers, polyurethane block copolymers, styrene-butadiene-styrene block copolymers, and the like.

The shape memory polymer or the shape memory alloy, may be activated by any suitable means, preferably a means for subjecting the material to a temperature change above, or below, a transition temperature. For example, for elevated temperatures, heat may be supplied using hot gas (e.g., air), steam, hot liquid, or electrical current. The activation means may, for example, be in the form of heat conduction from a heated element in contact with the shape memory material, heat convection from a heated conduit in proximity to the thermally active shape memory material, a hot air blower or jet, microwave interaction, resistive heating, and the like. In the case of a temperature drop, heat may be extracted by using cold gas, or evaporation of a refrigerant. The activation means may, for example, be in the form of a cool room or enclosure, a cooling probe having a cooled tip, a control signal to a thermoelectric unit, a cold air blower or jet, or means for introducing a refrigerant (such as liquid nitrogen) to at least the vicinity of the shape memory material.

Suitable magnetic materials include, but are not intended to be limited to, soft or hard magnets; hematite; magnetite; magnetic material based on iron, nickel, and cobalt, alloys of the foregoing, or combinations comprising at least one of the foregoing, and the like. Alloys of iron, nickel and/or cobalt, can comprise aluminum, silicon, cobalt, nickel, vanadium, molybdenum, chromium, tungsten, manganese and/or copper.

Suitable MR elastomer materials include, but are not intended to be limited to, an elastic polymer matrix comprising a suspension of ferromagnetic or paramagnetic particles, wherein the particles are described above. Suitable polymer matrices include, but are not limited to, poly-alpha-olefins, natural rubber, silicone, polybutadiene, polyethylene, polyisoprene, and the like.

Electroactive polymers include those polymeric materials that exhibit piezoelectric, pyroelectric, or electrostrictive properties in response to electrical or mechanical fields. The materials generally employ the use of compliant electrodes that enable polymer films to expand or contract in the in-plane directions in response to applied electric fields or mechanical stresses. An example of an electrostrictive-grafted elastomer with a piezoelectric poly(vinylidene fluoride-trifluoro-ethylene) copolymer. This combination has the ability to produce a varied amount of ferroelectric-electrostrictive molecular composite systems. These may be operated as a piezoelectric sensor or even an electrostrictive actuator. Activation of an EAP based pad preferably utilizes an electrical signal to provide change in shape orientation sufficient to provide displacement. Reversing the polarity of the applied voltage to the EAP can provide a reversible lockdown mechanism.

Materials suitable for use as the electroactive polymer may include any substantially insulating polymer or rubber (or combination thereof) that deforms in response to an electrostatic force or whose deformation results in a change in electric field. Exemplary materials suitable for use as a pre-strained polymer include silicone elastomers, acrylic elastomers, polyurethanes, thermoplastic elastomers, copolymers comprising PVDF, pressure-sensitive adhesives, fluoroelastomers, polymers comprising silicone and acrylic moieties, and the like. Polymers comprising silicone and acrylic moieties may include copolymers comprising silicone and acrylic moieties, polymer blends comprising a silicone elastomer and an acrylic elastomer, for example.

Materials used as an electroactive polymer may be selected based on one or more material properties such as a high electrical breakdown strength, a low modulus of elasticity—(for large or small deformations), a high dielectric constant, and the like. In one embodiment, the polymer is selected such that is has an elastic modulus at most about 100 MPa. In another embodiment, the polymer is selected such that is has a maximum actuation pressure between about 0.05 MPa and about 10 MPa, and preferably between about 0.3 MPa and about 3 MPa. In another embodiment, the polymer is selected such that is has a dielectric constant between about 2 and about 20, and preferably between about 2.5 and about 12. The present disclosure is not intended to be limited to these ranges. Ideally, materials with a higher dielectric constant than the ranges given above would be desirable if the materials had both a high dielectric constant and a high dielectric strength. In many cases, electroactive polymers may be fabricated and implemented as thin films. Thicknesses suitable for these thin films may be below 50 micrometers.

As electroactive polymers may deflect at high strains, electrodes attached to the polymers should also deflect without compromising mechanical or electrical performance. Generally, electrodes suitable for use may be of any shape and material provided that they are able to supply a suitable voltage to, or receive a suitable voltage from, an electroactive polymer. The voltage may be either constant or varying over time. In one embodiment, the electrodes adhere to a surface of the polymer. Electrodes adhering to the polymer are preferably compliant and conform to the changing shape of the polymer. Correspondingly, the present disclosure may include compliant electrodes that conform to the shape of an electroactive polymer to which they are attached. The electrodes may be only applied to a portion of an electroactive polymer and define an active area according to their geometry. Various types of electrodes suitable for use with the present disclosure include structured electrodes comprising metal traces and charge distribution layers, textured electrodes comprising varying out of plane dimensions, conductive greases such as carbon greases or silver greases, colloidal suspensions, high aspect ratio conductive materials such as carbon fibrils and carbon nanotubes, and mixtures of ionically conductive materials.

Materials used for electrodes of the present disclosure may vary. Suitable materials used in an electrode may include graphite, carbon black, colloidal suspensions, thin metals including silver and gold, silver filled and carbon filled gels and polymers, and ionically or electronically conductive polymers. It is understood that certain electrode materials may work well with particular polymers and may not work as well for others. By way of example, carbon fibrils work well with acrylic elastomer polymers while not as well with silicone polymers.

The active material may also comprise a piezoelectric material. Also, in certain embodiments, the piezoelectric material may be configured as an actuator for providing rapid deployment. As used herein, the term "piezoelectric" is used to describe a material that mechanically deforms (changes shape) when a voltage potential is applied, or conversely, generates an electrical charge when mechanically deformed. Employing the piezoelectric material will utilize an electrical signal for activation. Upon activation, the piezoelectric material can cause displacement in the powered state. Upon discontinuation of the activation signal, the strips will assume its original shape orientation, e.g., a straightened shape orientation.

Preferably, a piezoelectric material is disposed on strips of a flexible metal or ceramic sheet. The strips can be unimorph or bimorph. Preferably, the strips are bimorph, because bimorphs generally exhibit more displacement than unimorphs.

One type of unimorph is a structure composed of a single piezoelectric element externally bonded to a flexible metal foil or strip, which is stimulated by the piezoelectric element when activated with a changing voltage and results in an axial buckling or deflection as it opposes the movement of the piezoelectric element. The actuator movement for a unimorph can be by contraction or expansion. Unimorphs can exhibit a strain of as high as about 10%, but generally can only sustain low loads relative to the overall dimensions of the unimorph structure.

In contrast to the unimorph piezoelectric device, a bimorph device includes an intermediate flexible metal foil sandwiched between two piezoelectric elements. Bimorphs exhibit more displacement than unimorphs because under the applied voltage one ceramic element will contract while the other expands. Bimorphs can exhibit strains up to about 20%, but similar to unimorphs, generally cannot sustain high loads relative to the overall dimensions of the unimorph structure.

Suitable piezoelectric materials include inorganic compounds, organic compounds, and metals. With regard to organic materials, all of the polymeric materials with non-centrosymmetric structure and large dipole moment group(s) on the main chain or on the side-chain, or on both chains within the molecules, can be used as candidates for the piezoelectric film. Examples of suitable polymers include, for example, but are not limited to, poly(sodium 4-styrene-sulfonate) ("PSS"), poly S-119 (poly(vinylamine)backbone azo chromophore), and their derivatives; polyfluorocarbons, including polyvinylidene fluoride ("PVDF"), its co-polymer vinylidene fluoride ("VDF"), trifluoroethylene (TrFE), and their derivatives; polychlorocarbons, including poly(vinyl chloride) ("PVC"), polyvinylidene chloride ("PVDC"), and their derivatives; polyacrylonitriles ("PAN"), and their derivatives; polycarboxylic acids, including poly(meth-acrylic acid ("PMA"), and their derivatives; polyureas, and their derivatives; polyurethanes ("PU"), and their derivatives; bio-polymer molecules such as poly-L-lactic acids and their derivatives, and membrane proteins, as well as phosphate bio-molecules; polyanilines and their derivatives, and all of the derivatives of tetramines; polyimides, including Kapton molecules and polyetherimide ("PEI"), and their derivatives; all of the membrane polymers; poly(N-vinyl pyrrolidone) ("PVP") homopolymer, and its derivatives, and random PVP-co-vinyl acetate ("PVAc") copolymers; and all of the aromatic polymers with dipole moment groups in the main-chain or side-chains, or in both the main-chain and the side-chains, and mixtures thereof.

Further, piezoelectric materials can include Pt, Pd, Ni, Ti, Cr, Fe, Ag, Au, Cu, and metal alloys and mixtures thereof. These piezoelectric materials can also include, for example, metal oxide such as $SiO_2$, $Al_2O_3$, $ZrO_2$, $TiO_2$, $SrTiO_3$, $PbTiO_3$, $BaTiO_3$, $FeO_3$, $Fe_3O_4$, $ZnO$, and mixtures thereof, and Group VIA and IIB compounds, such as CdSe, CdS, GaAs, AgCaSe 2, ZnSe, GaP, InP, ZnS, and mixtures thereof.

Suitable active materials include, without limitation, shape memory alloys (SMA), ferromagnetic SMAs, shape memory polymers (SMP), piezoelectric materials, electroactive polymers (EAP), and magnetorheological elastomers (MR).

The activation signal provided by an activation device (not shown) may include a heat signal, a magnetic signal, an electrical signal, a pneumatic signal, a mechanical signal, and the like, and combinations comprising at least one of the foregoing signals, with the particular activation signal dependent on the materials and/or configuration of the active material. For example, a magnetic and/or an electrical signal may be applied for changing the property of the active material fabricated from magnetostrictive materials. A heat signal may be applied for changing the property of the active material fabricated from shape memory alloys and/or shape memory polymers. An electrical signal may be applied for changing the property of the active material fabricated from electroactive materials, piezoelectrics, electrostatics, and/or ionic polymer metal composite materials.

While the best modes for carrying out the invention have been described in detail, those familiar with the art to which this invention relates will recognize various alternative designs and embodiments for practicing the invention within the scope of the appended claims.

The invention claimed is:

1. A door system comprising:
   a structural member;
   a door being movably mounted with respect to the structural member;
   an actuator including an active material being configured to undergo a change in at least one attribute in response to an activation signal; said active material being operatively connected to the door such that said change in at least one attribute causes the door to move relative to the structural member;
   wherein said change in at least one attribute includes a change in shape; wherein said change in shape causes a force; and wherein said actuator is configured to transmit the force to the door thereby to move the door;
   wherein said active material reverses pseudo-plastic strain in response to the activation signal thereby to change in shape;
   a pinion gear being rotatably mounted with respect to one of the door and the structural member;
   a member at least partially defining a gear in meshing engagement with the pinion gear and being rigidly mounted with respect to the other of the door and the structural member; and
   a pulley mounted with respect to the pinion gear for rotation therewith;
   wherein said change in at least one attribute causes the pulley to rotate.

2. The door system of claim 1, wherein the active material is selected from the group consisting of shape memory alloy, ferromagnetic shape memory alloy, shape memory polymer, piezoelectric material, chemically active polymer, electroactive polymer, and magnetorheological elastomer.

3. The door system of claim 2, wherein the activation signal is selected from the group consisting of an electrical signal, a magnetic signal, an applied stress, and a thermal signal.

4. A vehicle comprising:
   a vehicle body;
   a door rotatably mounted with respect to the vehicle body; and an actuator including an active material being configured to undergo a change in at least one attribute in response to an activation signal; said active material being operatively connected to the door and the body such that said change in at least one attribute causes the door to move relative to the body;

wherein the active material is a shape memory material characterized by a predetermined shape; wherein the actuator is configured such that rotation of the door causes pseudo-plastic strain of the active material from the predetermined shape; and wherein the activation signal causes the active material to revert to its predetermined shape;

a check link assembly including a housing, and a check link;

wherein the housing is mounted with respect to the door;

wherein the check link is mounted with respect to the vehicle body; and wherein said active material is operatively connected to the housing and the check link such that said change in at least one attribute causes the check link to move relative to the housing.

5. The vehicle of claim 4, wherein the active material is selected from the group consisting of shape memory alloy, ferromagnetic shape memory alloy, shape memory polymer, piezoelectric material, chemically active polymer, electroactive polymer, and magnetorheological elastomer.

6. The vehicle of claim 4, wherein the activation signal is selected from the group consisting of an electrical signal, a magnetic signal, an applied stress, and a thermal signal.

7. A door system comprising:

a structural member;

a door being movably mounted with respect to the structural member;

an actuator including an active material being configured to undergo a change in at least one attribute in response to an activation signal; said active material being operatively connected to the door such that said change in at least one attribute causes the door to move relative to the structural member;

wherein the door defines an aperture and a door cavity;

wherein the door system further comprises a curved member mounted with respect to the structural member and extending through the aperture and into the door cavity; and a pulley rotatably mounted with respect to the door and engaging the active material;

wherein the active material is mounted to the door and the curved member inside the door cavity;

wherein said change in at least one attribute includes a change in shape; wherein said change in shape causes a force; and wherein said actuator is configured to transmit the force to the door thereby to move the door; and wherein said active material reverses pseudo-plastic strain in response to the activation signal thereby to change in shape.

* * * * *